United States Patent
Hu et al.

(10) Patent No.: US 12,008,218 B2
(45) Date of Patent: Jun. 11, 2024

(54) METHODS AND SYSTEMS FOR DISPLAYING INTERACTIVE INTERFACE OF RECOMMENDED BEHAVIOR

(71) Applicant: HITHINK ROYALFLUSH INFORMATION NETWORK CO., LTD., Zhejiang (CN)

(72) Inventors: Yi Hu, Hangzhou (CN); Yunsan Guo, Hangzhou (CN); Weiwei Shi, Hangzhou (CN)

(73) Assignee: HITHINK ROYALFLUSH INFORMATION NETWORK CO., LTD., Hangzhou (CN)

(*) Notice: Subject to any disclaimer, the term of this patent is extended or adjusted under 35 U.S.C. 154(b) by 19 days.

(21) Appl. No.: 17/660,413

(22) Filed: Apr. 24, 2022

(65) Prior Publication Data
US 2022/0244825 A1 Aug. 4, 2022

Related U.S. Application Data

(63) Continuation of application No. PCT/CN2020/093707, filed on Jun. 1, 2020.

(51) Int. Cl.
  *G06F 3/048* (2013.01)
  *G06F 3/0484* (2022.01)
(52) U.S. Cl.
  CPC .................... *G06F 3/0484* (2013.01)
(58) Field of Classification Search
  CPC ...................................................... G06F 3/0484
  See application file for complete search history.

(56) References Cited

U.S. PATENT DOCUMENTS

| | | | |
|---|---|---|---|
| 2011/0249082 A1 | 10/2011 | Xue | |
| 2016/0274764 A1* | 9/2016 | Moreau | G06F 40/106 |
| 2023/0041568 A1* | 2/2023 | Pan | H04W 28/0236 |

FOREIGN PATENT DOCUMENTS

| | | |
|---|---|---|
| CN | 104898840 A | 9/2015 |
| CN | 106918348 A | 7/2017 |
| CN | 108062195 A | 5/2018 |
| CN | 109472670 A | 3/2019 |

OTHER PUBLICATIONS

International Search Report in PCT/CN2020/093707 dated Feb. 25, 2021, 7 pages.
Written Opinion in PCT/CN2020/093707 dated Feb. 25, 2021, 9 pages.

* cited by examiner

*Primary Examiner* — David E Choi
(74) *Attorney, Agent, or Firm* — METIS IP LLC

(57) ABSTRACT

The present disclosure example discloses a method for displaying an interactive interface of a recommended behavior. The method may include determining a prompt mode according to at least one of recommended content associated with a first user, one or more user characteristics associated with the first user, one or more environmental characteristics of a user terminal associated with the first user, or one or more first presentation data characteristics associated with the user terminal, the prompt mode including at least one of a plurality of system prompt modes of the user terminal, a plurality of user interface prompt modes of the user terminal, a vibration prompt mode of the user terminal, or a voice prompt mode of the user terminal; and prompting the first user for the recommended content based on the prompt mode.

18 Claims, 12 Drawing Sheets

400

```
┌─────────────────────────────────────────┐
│  Determining, based on the prompt mode, │
│  a prompt position and a prompt         │
│  interface range for presenting the     │      402
│  recommended content based on a user    │
│  interface of the user terminal, the    │
│  prompt position including a coexisting │
│  position associated with the user      │
│  interface or a suspension position     │
│  associated with the user interface     │
└─────────────────────────────────────────┘
                     │
                     ▼
┌─────────────────────────────────────────┐
│  Prompting the first user for the       │
│  recommended content with at least one  │
│  of an icon prompt, a flashing prompt,  │      404
│  a scrolling prompt, or an auxiliary    │
│  interface prompt based on the prompt   │
│  position and the prompt interface      │
│  range, the auxiliary interface prompt  │
│  including text and/or one or more      │
│  charts                                 │
└─────────────────────────────────────────┘
```

FIG. 4

METHODS AND SYSTEMS FOR DISPLAYING INTERACTIVE INTERFACE OF RECOMMENDED BEHAVIOR

CROSS-REFERENCE TO RELATED APPLICATIONS

This application is a continuation of International Application No. PCT/CN2020/093707, filed on Jun. 1, 2020, the contents of which are incorporated herein by reference to its entirety.

TECHNICAL FIELD

Embodiments of the present disclosure relate to the field of Internet, and in particularly, to methods, systems, and devices for displaying an interactive interface of a recommended behavior.

BACKGROUND

The human-computer interactive interface has appeared in various aspects in people's lives. Traditional human-computer interactive processes is usually passive. A person who uses a smart device (i.e., a user) first initiates an operation, then the smart device responds to the user's operation according to some established rules.

With the development of artificial intelligence technology, it is common to initiate interaction to smart device users. For example, an application program (APP) based on artificial intelligence technology can recommend stocks, movies, music, goods, etc. for users initiatively. However, under certain scenarios, initiating content recommendation to a user may cause interference to the current operation of the user.

Therefore, it is desirable to provide a method for displaying an interactive interface of a recommended behavior, thereby reducing interference to a user when content recommendation is initiated to the user.

SUMMARY

According to an aspect of the embodiments of the present disclosure, a method for displaying an interactive interface of a recommended behavior is provided. The method may include: determining a prompt mode according to at least one of recommended content associated with a first user, one or more user characteristics associated with the first user, one or more environmental characteristics of a user terminal associated with the first user, or one or more first presentation data characteristics associated with the user terminal, the prompt mode including at least one of a plurality of system prompt modes of the user terminal, a plurality of user interface prompt modes of the user terminal, a vibration prompt mode of the user terminal, or a voice prompt mode of the user terminal; and prompting the first user for the recommended content based on the prompt mode.

According to another aspect of the present disclosure, a system for displaying an interactive interface of a recommended behavior is provided. The system may include: a first determination module configured to determine a prompt mode according to at least one of recommended content associated with a first user, one or more user characteristics associated with the first user, one or more environmental characteristics of a user terminal associated with the first user, or one or more first presentation data characteristics associated with the user terminal, the prompt mode including at least one of a plurality of system prompt modes of the user terminal, a plurality of user interface prompt modes of the user terminal, a vibration prompt mode of the user terminal, or a voice prompt mode of the user terminal; and a first prompt module configured to prompt the first user for the recommended content based on the prompt mode.

According to another aspect of the present disclosure, a method for displaying an interactive interface of a recommended behavior is provided. The method may include: determining prompt content according to recommended content associated with a user; determining a prompt instruction according to at least one of the recommended content, one or more user characteristics associated with the user, or one or more second presentation data characteristics of a user terminal associated with the user; and sending the prompt content and the prompt instruction to the user terminal, the prompt instruction being configured to determine a prompt mode of the user terminal for the prompt content.

According to another aspect of the present disclosure embodiment, a system for displaying an interactive interface of a recommended behavior is provided. The system may include: a second determination module configured to determine prompt content according to recommended content associated with a user; a third determination module configured to determine a prompt instruction according to at least one of the recommended content, one or more user characteristics associated with the user, or one or more second presentation data characteristics of a user terminal associated with the user; and a sending module configured to send the prompt content and the prompt instruction to the user terminal, the prompt instruction being configured to determine a prompt mode of the user terminal for the prompt content.

According to another aspect of the present disclosure embodiment, a method for displaying an interactive interface of a recommended behavior is provided. The method may include: obtaining prompt content associated with a user and a prompt instruction from a server; obtaining one or more environmental characteristics of a user terminal associated with the user and/or one or more prompt settings associated with the user terminal; determining a prompt mode for the prompt content according to at least one of the one or more environmental characteristics, the one or more prompt settings, or the prompt instruction, the prompt mode including different system prompt modes of the user terminal, different user interface prompt modes of the user terminal, a vibration prompt mode of the user terminal, or a voice prompt mode of the user terminal; and prompting the user for the prompt content based on the prompt mode.

According to another aspect of the present disclosure, a system for displaying an interactive interface of a recommended behavior is provided. The system may include: a first obtaining module configured to obtain prompt content associated with a user and a prompt instruction from a server; a second obtaining module configured to obtain one or more environmental characteristics of a user terminal associated with the user and/or one or more prompt settings associated with the user terminal; a fourth determination module configured to determine a prompt mode for the prompt content according to at least one of the one or more environmental characteristics, the one or more prompt settings, or the prompt instructions, the prompt mode including different system prompt modes of the user terminals, different user interface prompt modes of the user terminal, a vibration prompt mode of the user terminal, or a voice prompt mode of the user terminal; and a second prompt module configured to prompt the user for the prompt content based on the prompt mode.

According to one aspect of the embodiment of the present disclosure, a device for displaying an interactive interface of a recommended behavior is provided. The device may include at least one storage device and at least one processor. The at least one storage device may be configured to store computer instructions. The at least one processor may be configured to perform the computer instructions to execute the method for displaying an interactive interface of a recommended behavior.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is a schematic diagram illustrating an exemplary process for prompting a user based on a user interface prompt mode according to some embodiments of the present disclosure;

DETAILED DESCRIPTION

Figure 1:
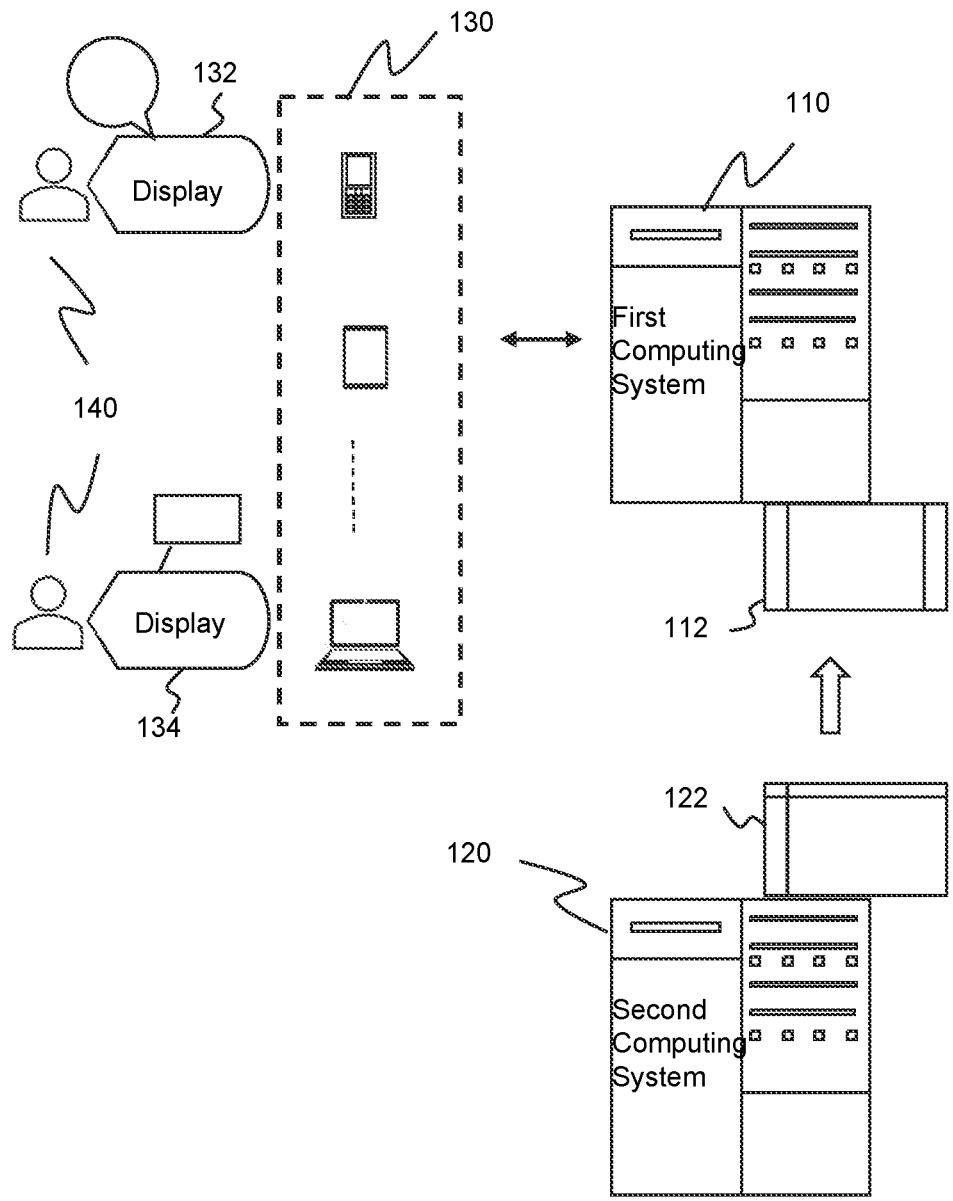
FIG. 1 is a schematic diagram illustrating an exemplary application scenario of a system for displaying an interactive interface of a recommended behavior according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It will be understood that the term "system," "engine," "unit," "module," and/or "block" used herein are one method to distinguish different components, elements, parts, section or assembly of different levels in ascending order. However, the terms may be displaced by another expression if they achieve the same purpose.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It should be noted that the foregoing or the following operations may not be performed in the order accurately. Instead, the steps can be processed in reverse order or simultaneously. Besides, one or more other operations may be added to the flow charts, or one or more operations may be omitted from the flow chart.

FIG. 1 is a schematic diagram illustrating an exemplary application scenario of a system for displaying an interactive interface of a recommended behavior according to some embodiments of the present disclosure. A first computing system 110 may be applied in a plurality of application scenarios of content recommendation. For example, the first computing system 110 may automatically recommend stock-related information according to characteristic information of a user of a stock application. As another example, the first computing system 110 may automatically recommend a product based on characteristic information of a user of a shopping application. For example, the first computing system 110 may automatically recommend a social group or an organization based on characteristic information of a user of a social application.

As shown in FIG. 1, the application scenario may include the first computing system 110, a second computing system 120, a user terminal 130, or the like.

In a typical application scenario, a user 140 may access the user terminal 130. The user terminal 130 may send information collected and/or accessed by the user to the first computing system 110. The first computing system 110 may perform prediction according to the information collected by the user terminal 130 and/or accessed by the user to determine content recommended to the user and/or a prompt mode of the content. The first computing system 110 may send the content recommended to the user and the prompt mode to the user terminal 130. For example, a user may use a stock application through the user terminal 130. The user terminal 130 may send information searched/browsed by the user to the first computing system 110. The first computing system 110 may determine content recommended to the user and a prompt mode of a reminder to the user according to the current search and browsing of the user. The first computing system 110 may send the recommended content and the prompt mode to the user terminal 130. The user terminal 130 may display the content in accordance with the received prompt mode, for example, a display 132 and a display 134.

In another typical application scenario, the first computing system 110 may determine prompt content according to recommended content associated with a user. The first computing system 110 may determine a prompt instruction according to the recommended content, one or more user characteristics associated with the user, one or more second presentation data characteristics of a user terminal associated with the user, or any combination thereof. The first computing system 110 may send the prompt content and the prompt instruction to the user terminal 130, and the prompt instruction may be configured to determine a prompt mode of the user terminal 130 of the prompt content.

In yet another typical application scenario, the user terminal 130 may obtain prompt content associated with a user and a prompt instruction from the first computing system 110. The user terminal 130 may obtain one or more environmental characteristics of the user terminal 130 associated with the user and/or one or more prompt settings associated with the user terminal 130. The user terminal 130 may determine a prompt mode for the prompt content according to the one or more environmental characteristics, the one or more prompt settings, the prompt instruction, or any combination thereof. The user terminal 130 may prompt the user for the prompt content according to the prompt mode.

In some embodiments, the first computing system 110 may determine a prompt mode to send a reminder to a user through a prediction model 112. The prediction model 112 may be trained on the second computing system 120 based on sample data. The second computing system 120 may be the same as or different from the first computing system 110. The sample data used by the training may be the same as or different from the data used by the first computing system 110 to determine the prompt mode.

The first computing system 110 and the second computing system 120 may refer to systems having computing capabilities, which may include various computers, such as a server, a personal computer, or the like, or a computing platform including a plurality of computers in various structural connections.

The first computing system 110 and the second computing system 120 may include one or more processors, and the one or more processors may execute program instructions. The one or more processors may include various common general central processing units (CPUs), graphics processing units (GPUs), microprocessors, application-specific integrated circuits (ASICs), or other types of integrated circuits.

The first computing system 110 and the second computing system 120 may include one or more storage devices, and the one or more storage devices may store instructions or store data. The one or more storage devices may include a mass storage, a removable storage, a volatile read-and-write memory, a read-only memory (ROM), or the like, or any combination thereof.

The first computing system 110 and the second computing system 120 may also include a network for an internal connection and an external connection. The first computing system 110 and the second computing system 120 may also include terminals for input or output. The network may be any type of wired or wireless network, or any combination thereof. The terminals may include various types of devices having information receiving and/or sending functions such as computers, mobile phones, text scanning devices, display devices, printers, etc.

The user terminal 130 refers to an electronic device used by a user, which may include various types of mobile devices, smart devices, wearable devices, such as mobile phones, tablets, laptop computers, smart bracelets, car computers, etc.

The first computing system 110 may obtain data by the user terminal 130, and the data may be data for prediction. For example, the data may be user data, environmental data, data displayed in the screen, or the like. The data may enter into the first computing system 110 through the user terminal 130 through various common ways.

The first computing system 110 may include the prediction model 112, and parameters of the prediction model 112 may come from a well-trained model 122. The parameters may be passed in any common way. In some embodiments, the prediction model 112 may be the same as the model 122. The first computing system 110 may generate a result based on the prediction model 112, and the result may be a result predicted by the prediction model 112 based on the data. For example, the prediction model 112 may be a prediction model, and the result may be a prompt mode to recommend a product and/or information to a user, for example, a user interface prompt mode, a system prompt mode of a user terminal, a message prompt mode (a short messaging service (SMS), a mail, etc.), a voice prompt mode, a vibration prompt mode, etc.

The second computing system 120 may obtain sample data, and the sample data may be data for training models. For example, the sample data may be data for training preliminary prediction models. The sample data may enter into the second computing system 120 through various common ways.

In the second computing system 120, the model 122 may be trained to update parameters of the model 122 to obtain a well-trained model. For example, the model 122 may be a preliminary prediction model.

Models (e.g., the prediction model 112 and/or the model 122) may refer to a collection of several manners based on processing devices. These manners may include a large count of parameters. When the model is executed, the parameters used may be pre-set, or may be dynamically adjusted. Some parameters may be obtained by training manners, and some parameters may be obtained during the execution. Specific descriptions of the models involved in the present disclosure may be found in FIG. 3 and relevant descriptions thereof.

Figure 2:
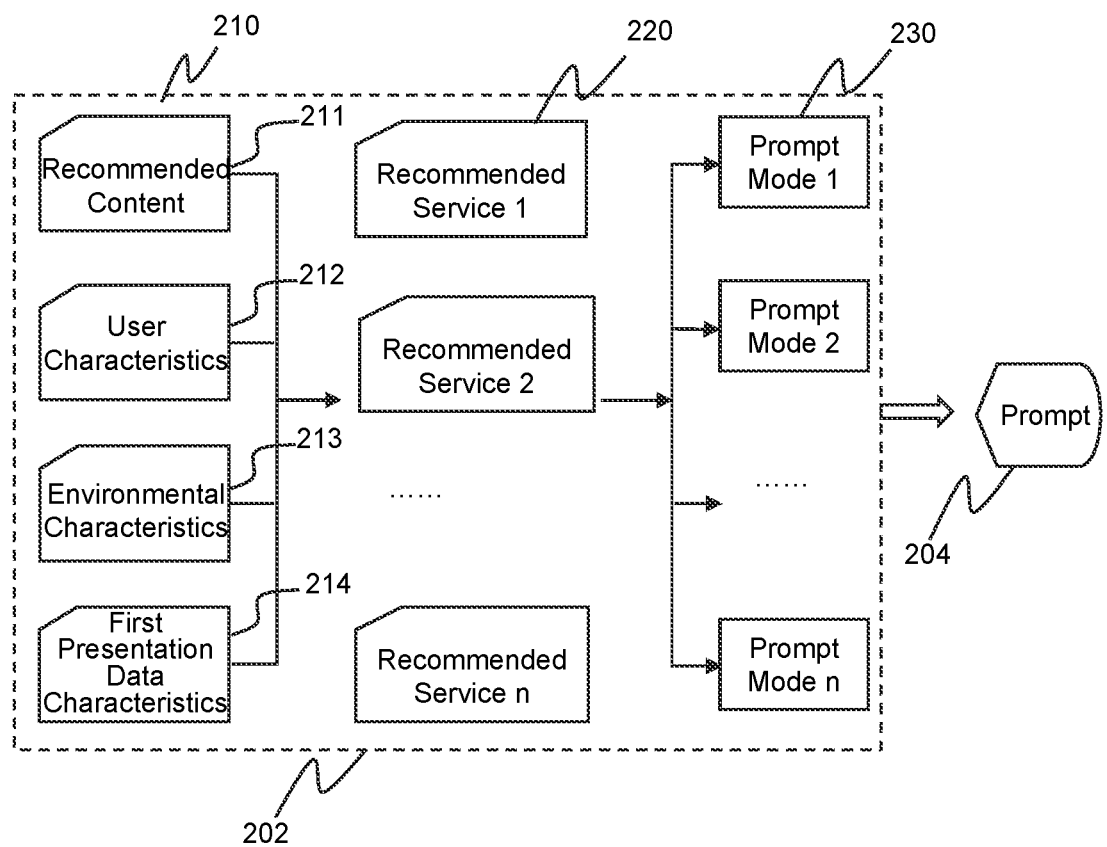
FIG. 2 is a flowchart illustrating an exemplary process for displaying an interactive interface of a recommended behavior according to some embodiments of the present disclosure.

FIG. 2 is a flowchart illustrating an exemplary process for displaying an interactive interface of a recommended behavior according to some embodiments of the present disclosure. As shown in FIG. 2, the process may include the following operations.

In 202, a prompt mode may be determined according to recommended content associated with a first user, one or more user characteristics associated with the first user, one or more environmental characteristics of a user terminal associated with the first user, one or more first presentation data characteristics associated with the user terminal, or any combination thereof. Specifically, operation 202 may be performed by a first determination module 710.

As shown in FIG. 2, characteristics 210 may include recommended content 211, one or more user characteristics 212, one or more environmental characteristics 213, and one or more first presentation data characteristics 214, or the like.

The one or more user characteristics 212 may refer to one or more objective and/or performance characteristics of the first user. For example, the first user's gender, age, income, personalities, behavioral habits, etc.

In some embodiments, a processing device (e.g., the first computing system 110) may obtain the one or more user characteristics in a common manner, for example, network transmission, interface calling, or the like.

In some embodiments, the one or more user characteristics may include one or more identity characteristics and/or one or more user historical operation characteristics. The one or more identity characteristics and the one or more user historical operation characteristics may characterize information from different angles, such as the first user's own characteristics, preferences, personalities, etc. In this way, the recommended content and the prompt mode may be determined based on the one or more user characteristics.

The one or more identity characteristics may refer to one or more characteristics of the first user's basic information from the perspective of the first user. For example, the first user's gender, age, personalities, academic qualifications, income, occupation, risk tolerance, decision-making preferences, etc. In this way, it may be possible to determine the first user's preferences (for example, like shopping), habits (for example, having a habit of purchasing stock funds or not), etc. by the user's gender, age, personalities, etc. to further accurately determine recommended content that the first user may want to know and an acceptable prompt mode, thereby providing the first user with better active services.

The one or more user historical operation characteristics may refer to one or more characteristics of behavior information such as user habits, historical actions. For example, the one or more user historical operation characteristics may include user historical browsing data (for example, browsing through financial news, international crude oil market consulting, stock consulting, certain goods, etc.), user historical operation data (such as registration, attention, click, close, collection, comment, feedback, etc.), etc. The one or more user historical operation characteristics may reflect user habits, preferences more directly, thereby further increasing the accuracy of the determined recommended content and the prompt mode.

The one or more environmental characteristics 213 may refer to various types of information related to the user terminal, and/or an environment where the user terminal is currently located, for example, time, place, a use status of the user terminal, etc.

In some embodiments, the one or more environmental characteristics 213 may be obtained by various sensors (such as a temperature sensor, an infrared sensor, a sound sensor, etc.) of the user terminal and various system plug-in programs.

In some embodiments, the one or more environmental characteristics 213 may include time information, one or more motion characteristics, one or more sound characteristics, one or more position characteristics, one or more functional use characteristics, one or more network characteristics, one or more terminal status characteristics, or the like, or any combination thereof. The one or more environmental characteristics 213 may be used from a perspective other than the user himself/herself, and external factors may be taken into account when providing active services, thereby further providing users with better active services.

The time information may refer to a reality time of a position where the user terminal is located. For example, 8:00 a.m. (Beijing time). In some embodiments, the prompt mode may be determined based on the time information. For example, a prompt mode with less interference to the first user during working hours may be chosen, and a prompt mode that is richer in content and more likely to attract the first user's attention during leisure time may be chosen.

According to the time information, it may be possible to predict whether the first user needs active services from the perspective of time, and reduce the interference that may be caused to the first user when providing recommended content.

The one or more motion characteristics may be a current action state of the first user, such as lying, sitting, standing, walking, running, riding, driving, etc. The one or more motion characteristics may reflect the first user's intention from a perspective of the action state. For example, if the first user is in standing, the first user may be in an idle state, and the user interface prompt mode may be chosen, and more rich content may be displayed to the first user.

According to the one or more motion characteristics, it may be possible to predict whether the first user needs active services from the perspective of the first user's action, and the current state of the first user may be fitted as much as possible so as to reduce the interference that may be caused to the first user when providing recommended content.

The one or more sound characteristics may be the performance of sound in the surrounding environment, such as street murmur, crowd screaming, traffic noise, lyric music, etc. In some embodiments, a suitable prompt mode may be determined based on the one or more sound characteristics. For example, if the first user is in a noisy environment, the first user may not hear the sound prompt, so the user interface prompt or vibration prompt may be used.

According to the one or more sound characteristics, it may be possible to determine whether the prompt mode (for example, sound prompt) can cause the first user to pay attention from a perspective of the scene sound, avoiding affecting the first user's usage experience due to failure to promptly remind the first user.

The one or more position characteristics may indicate where the user terminal is located, for example, shopping malls, office buildings, residential areas, schools, stations, etc. According to the user terminal, the first user's behavior may be known indirectly, for example, the first user may wait for the vehicle in the station. At this time, the first user may be idle, and a user interface prompt with richer prompt content may be selected. As another example, the first user may be at work in the office building, and a user terminal vibration prompt with less interference may be selected.

According to the one or more position characteristics, the user state may be predicted from the geographic position, thereby determining the appropriate prompt mode, providing a better service to the first user.

The one or more functional use characteristics may be the usage status of the function provided by the user terminal, for example, video, voice, calls, etc. Based on the one or more functional use characteristics of the user terminal, an appropriate prompt mode may be determined more accurately. For example, if the first user is in a call, a prompt mode with less interference to a user's current behavior may be selected, for example, a user interface prompt that the first user can see in the user interface after the call. In this way, it may not only send reminders to the first user, and but also reduce the interference to the first user as much as possible, so as to provide a better service for the first user.

The one or more network characteristics may refer to the network signal of the user terminal, for example, Ethernet, WiFi, 2G, 3G, 4G, 5G, or the like. According to the one or more network characteristics of the user terminal, a prompt mode that matches the user terminal network may be selected. For example, if the user network is 4G or 5G, a prompt mode that consumes less data may be selected. If the user network is Ethernet or WiFi, a prompt mode with richer and larger data consumption may be selected.

Selecting the prompt mode based on the network may avoid the impact on the first user due to excessive data consumption by some prompt modes.

The one or more terminal status characteristics may refer to device status of the user terminal, such as off-screen, do-not-disturb, screen brightness, memory utilization, CPU utilization, residual power, device temperature, etc. According to the one or more terminal status characteristics of the user terminal, a prompt mode that matches the user terminal state may be selected, for example, if the user terminal is in the do-not-disturb state, a prompt mode with least interference to the first user may be selected. If the first user is in the off-screen state, a vibration or sound prompt mode may be selected, so that the first user may be reminded without interference. As another example, if the CPU utilization and device temperature are high, the user terminal may be in high load operation, and the first user may use large software or play games, etc. At this time, the first user may not want to be disturbed, then a prompt mode with less interference to the first user may be selected. As yet another example, if the screen brightness of the user terminal is high, the first user may be outdoors, and a mode suitable for outdoor reminding may be selected, for example, sound prompt, etc.

According to the one or more terminal status characteristics, the user status may be predicted from the perspective of the device status, thereby determining the appropriate prompt mode, providing a better service for the first user.

The recommended content 211 may be content that the first user may be interested in and is predicted by the processing device (the first computing system 110). The recommended content 211 may be any type of content that the first user may be interested in. For example, the recommended content 211 may be an article (such as news reports), applications, shopping goods, stock funds, movie TV dramas, music, etc.

In some embodiments, the recommended content 211 may be determined in a plurality of common ways. For example, the recommended content 211 may be predicted based on data, and the relevant content may be selected as the recommended content 211.

In some embodiments, the recommended content 211 may be determined by the processing device (e.g., the first computing system 110) according to the one or more user characteristics, the one or more environmental characteristics, the one or more first presentation data characteristics, or any combination thereof. For example, the recommended content 211 may be determined by a model or an algorithm, and the input of the model may be one or more of the above characteristics, and the output may be recommended content 211. For example, characteristics such as "gender, female," "age, 30," "10:30 a.m.," "office building," "static sitting," or the like, or any combination thereof may be input into the model, and the recommended content 211 for "stock information" may be output by the model.

The one or more first presentation data characteristics 214 may refer to the information currently browsed by the first user, and may also be understood as the information currently displayed in the screen of the user terminal. For example, an application interface in a certain application software displayed by the user terminal, and the first user may be browsing news, stocks or chatting through the application software. As another example, what the user terminal currently displays may be the system interface of the user terminal, and the system interface may display music lyrics.

The user's current state may be learned from the one or more first presentation data characteristics 214. For example, the aforementioned user terminal shows that the first user is browsing news, stocks or chatting, etc., indicating that the user's current state is comparatively idle. As another example, the system interface displayed by the user terminal is music lyrics, indicating that the first user is listening to music. According to the user's current state, it may be possible to determine whether it is appropriate to provide recommended content to the first user at present, thereby avoiding interference to the first user when reminding the first user. In some embodiments, the recommended content 211 may be determined based on the one or more first presentation data characteristics 214, for example, the recommended content 211 may be content related to the one or more first presentation data characteristics 214.

In some embodiments, the one or more first presentation data characteristics 214 may include information from the server (e.g., information transmitted by the server to the user terminal) and information from other data sources (e.g., information input by the user, derived from the user terminal, and obtained from other servers or other user terminals by the user terminal).

In some embodiments, the one or more first presentation data characteristics 214 may be obtained by user input. For example, the first user may upload images, input text, input voice, etc. from the user terminal. In some embodiments, the one or more first presentation data characteristics 214 may be obtained from the storage device. The storage device may be a storage device that comes with a processing device (e.g., the user terminal 130, the first computing system 110), or an external storage device that does not belong to the processing device, for example, an optical disk, a hard disk, or the like. In some embodiments, the one or more first presentation data characteristics 214 may also be read through an interface, including but not limited to a program interface, a data interface, a transmission interface, or the like. In some embodiments, the one or more first presentation data characteristics 214 may also be obtained in any way known to those skilled in the art, which is not limited in the present disclosure.

It should be noted that the characteristics 210 may include but are not limited to, the recommended content 211, the one or more user characteristics 212, the one or more environmental characteristics 213, and the one or more first presentation data characteristics 214. The characteristics 210 may further include other characteristics, which will not be limited in the present disclosure.

The prompt mode 230 may refer to the mode used by the user terminal (for example, the user terminal 130) to remind the first user that there is a message. The prompt mode may include a plurality of modes such as a system prompt mode of the user terminal (prompt mode 1), a user interface prompt mode of the user terminal (prompt mode 2), a vibration prompt mode of the user terminal (prompt mode 3), a voice prompt mode of the user terminal (prompt mode 4), or any combination thereof.

The user terminal system prompt mode may refer to a system prompt configured by the user terminal, such as system notification, or the like. The user interface prompt mode may refer to a prompt on the user's current operation interface (for example, the program interface of an application), such as tags, pop-up windows, banners, bubbles, toasts, etc. The user terminal vibration prompt mode may refer to a prompt with vibration. The vibration may include micro-vibration, strong vibration, brief vibration, continuous vibration, or the like. The voice prompt mode may refer to a prompt with sound. The sound may include prompt sound, music, voice, or the like. More descriptions of the prompt mode may refer to operation 204 in FIG. 4 and relevant descriptions thereof, which will not be repeated herein.

In some embodiments, the first determination module 710 may determine the one or more prompt modes 230 based on the characteristics 210.

The first determination module 710 may determine the one or more prompt modes 230 using a prediction model, and a model for determining a prompt mode may be named as a first prediction model. The input of the first prediction model may be the characteristics 210, or any combination thereof, and the output may be a prompt mode. More descriptions about the first prediction model may be found in FIG. 3 and relevant descriptions thereof, which will not be repeated herein.

In some embodiments, the first determination module 710 may determine the one or more prompt modes 230 based on the recommended content 211, the one or more user characteristics 212, the one or more environmental characteristics 213, the one or more first presentation data characteristics 214, or any combination thereof through matching rules. The matching rules may be one or more preset conditions for the one or more prompt modes 230, respectively. When the recommended content 211, the one or more user characteristics 212, the one or more environmental characteristics 213, the one or more first presentation data characteristics 214, or any combination thereof meet any preset conditions, the prompt mode corresponding to the preset condition may be determined as the prompt mode. The preset conditions may be a type of recommended content, the first user's age, gender, time period, a type of geographic position, a type of presentation data, or the like, any combination thereof. For example, the first preset condition may be set for the user terminal system prompt mode, and the first preset condition may be that the recommended content is short video, the user's age is from 18 to 30 years old, and the time is from 19 o'clock to 22 o'clock. As another example, the second preset condition may be set for the user interface prompt mode, and the second preset condition may be that the recommended content is text news, network products, applications, the user's age is from 20 to 50 years old, the user's gender is female, the time is from 10 o'clock to 23 o'clock, the geographic position is the community, shopping malls or stations, and types of the presentation data characteristics may be forums, social communication, shopping, etc. The content of the preset conditions may be customized. A prompt mode with high user acceptance may be predicted by setting preset conditions.

It should be noted that a preset condition may correspond to a prompt mode, or a plurality of prompts. For example, the user interface prompt mode and vibration prompt mode may simultaneously correspond to one same preset condition.

It may be understand that it is difficult to determine the optimal prompt mode through simple rules due to a large count of characteristic combinations. Therefore, it may be easier to get close to the actual diverse user preferences to determine the optimal prompt mode based on complex various characteristic combinations by using the first prediction model.

As shown in FIG. 2, in some embodiments, the first determination module 710 may also determine recommended services 220 based on the characteristics 210, and determine the prompt modes 230 based on the recommended services 220. The recommended services 220 may refer to expression forms when the recommended content 211 is recommended. The recommended services 220 may include a plurality of services, for example, natural language text form recommendation (recommended service 1), voice recommendation (recommended service 2), application recommendation (recommended service 3), etc. Specifically, the first determination module 710 may determine the recommended services 220 through matching rules or using a second prediction model.

In some embodiments, the first determination module 710 may determine the recommended services 220 based on the characteristics 210 by the second prediction model. Specifically, the second prediction model may output predicted recommended services based on the input characteristics 210. The second prediction model type may be similar to the first prediction model, and the specific details may be found in FIG. 3 and relevant descriptions thereof, which will not be repeated herein.

In some embodiments, the recommended services may be determined in matching rules according to the recommended content 211, the one or more user characteristics 212, the one or more environmental characteristics 213, the one or more first presentation data characteristics 214, or any combination thereof. The matching rules may be setting a preset condition for one or more recommended services. When the recommended content 211, the one or more user characteristics 212, the one or more environmental characteristics 213, the one or more first presentation data characteristics 214, or any combination thereof meet any preset conditions, the corresponding recommended services may be determined. For example, the first preset condition may be set for the recommended service 1, and the second preset condition may be set for the recommended service 2. The preset conditions may be the same as or similar to the preset conditions set by one or more prompt modes described above in the present disclosure. More details may be found above, which will not be repeated herein.

Further, one or more corresponding prompt modes may be set for each recommended service. In this way, after the recommended service is determined, the prompt mode corresponding to the recommended service may be directly determined as a prompt mode. The correspondence between the recommended service and the prompt mode may also be determined by matching rules, for example, a voice prompt mode for voice recommendation, a system prompt mode of a user terminal for application recommendation, and a user interface prompt mode for natural language text forms recommendation. It should be noted that the relationship between the recommended service and the prompt mode is relatively simple, and the correspondence between the two may be set directly according to the requirements.

In some embodiments, one characteristic combination of any combination of the recommended content 211, the one or more user characteristics 212, the one or more environmental characteristics 213, and the one or more first presentation data characteristics 214 may match a plurality of recommended services. A recommended service may also correspond to a plurality of prompt modes, which is not limited in the present disclosure.

Compared with determining the prompt mode directly based on the numerous characteristics, determining the prompt mode based on the recommended service may further consider the presentation form of the recommended content 211, and screen the available prompt modes again, so that the finalized prompt mode may be more in line with the first user's needs to better provide active services to the first user. For example, when shopping goods are recommended to the first user, a conventional recommendation mode may be to send a text introduction and links of the shopping goods to the first user. If the first user is inconvenient to view the recommended content, the first user may miss or ignore the prompt message. In the solution provided in the embodiments of the present disclosure, a recommended service, such as a voice recommendation service may be first determined before a prompt mode is determined, so that the form of the recommended content may be more in line with the current state of the first user, and the introduction of the shopping goods may be directly voice broadcast to the first user to facilitate the first user to know the recommended content directly.

In some embodiments, in order to more accurately determine an appropriate prompt mode, and reduce the interference that may be caused to the user when the prompt is initiated to the first user, the prompt mode may be divided into a modal and a non-modal based on the degree of interference to the user. Wherein, the modal may interrupt the user from the current operational state, and focus on the processing of the specific state of the modal. The possible manifestation of the modal is that other operations of the user will be blocked, and the user may focus on the current modal. Unless the process in the modal ends or is interrupted, the original normal operation process may be returned. The non-modal may not interrupt the user's current operation, and the user may still perform the original operation. It may be seen that the modal interference to the user may be serious, and the non-modular interference to the user may be small. For example, the auxiliary interface prompt mode in the user interface prompt mode may be modal prompt mode, and the user's focus may be easier to focus on the prompt in the user interface. An icon prompt, a flashing prompt, a banner prompt, a scrolling prompt, a bubble prompt, a toast prompt, etc. in the user interface prompt mode may be non-modal prompt mode, which may not interrupt the user's current operation. As another example, a system prompt mode of a user terminal, a vibration prompt mode of the user terminal, or a sound prompt mode of the user terminal may belong to a non-modal prompt mode that may not interrupt the user's current operation.

Further, a confidence level may be set for the recommendation service, and the modal or non-modal prompt mode may be determined based on the confidence level. The confidence level may refer to the possibility that the user needs to use the recommended service. The lower the possibility, the lower the confidence level. The higher the possibility, the higher the confidence level. The confidence level may include a plurality of levels, such as four levels including extremely low, low, medium, and high. When the confidence level is low, the non-modal prompt mode may be matched, and the modal prompt mode may be matched when confidence level is high. For example, the confidence level is low, which means that the user has a low possibility of being interested in the recommended content. In order to minimize interference to the user, it may be possible to match a voice prompt mode, a vibration prompt mode, etc. that have a small amount of information and small display elements but generate minimum interference to the user. High confidence level may match a prompt mode with a large interference to the user. For example, the confidence level is high, which means that the user is more likely to be interested in the recommended content. In order to provide the user with as much convenience as possible, it may be possible to match an active user interface prompt mode with more information and more display elements.

In some embodiments, the confidence level may be set based on the user's interactive feedback. Specifically, different confidence levels may be determined according to the interactive feedback (e.g., clicking, closing, ignoring, collection, etc.) given by the user after the recommended service is sent to the user terminal in different prompt modes. For example, after a same recommended service is sent to a plurality of users in a plurality of prompt modes (such as a system prompt mode of a user terminal, a user interface prompt mode of the user terminal, a vibration prompt mode, etc.), among the interactive feedback given by the user, the positive feedback (such as clicking, collection) rate of the system prompt mode of the user terminal may be 30%, the positive feedback rate of the user interface prompt mode may be 80%, and the positive feedback rate of the vibration prompt mode may be 50%, it may be considered that the user has the highest acceptance of the user interface prompt mode, and its confidence level may be set to high, a confidence level of the vibration prompt mode may be set to medium, and the confidence level of the system prompt mode of the user terminal may be set to low. The possibility of interference to the user may be determined using the confidence level, and a prompt mode of different interference may be selected based on the confidence levels, so that an appropriate prompt mode may be more accurately determined, and finally a most useful and most informative active service may be provided to the user under the premise of minimizing the interference to the user. It should be noted that interactive feedback may include user's historical interactive feedback and real-time interactive feedback. The set confidence level may be continuously adjusted based on the real-time interactive feedback so as to more accurately to determine the possibility of interference to the user through the confidence level.

In 204, the first user may be prompted for the recommended content based on the prompt mode. Specifically, operation 204 may be performed by a first prompt module 720.

The prompt may refer to reminding the first user. For example, the first user may be prompted through a vibration prompt mode, a voice prompt mode, a pop-up window prompt mode, a flashing prompt mode, a message prompt mode (such as an SMS, a mail), etc., or various prompt modes such as a system prompt mode of a user terminal (prompt mode 1), a user interface prompt mode of the user terminal (prompt mode 2), a vibration prompt mode of the user terminal (prompt mode 3), a voice prompt mode of the user terminal (prompt mode 4) to remind the first user that new recommended content has arrived for the first user to view.

As shown in FIG. 2, after the prompt mode is determined, the first prompt module 720 may send a prompt in a corresponding form to the first user according to the determined prompt mode. For example, if the determined prompt mode is the system prompt mode of the user terminal (prompt mode 1), a system prompt may be sent to the first user.

In some embodiments, when the first user is reminded using the user interface prompt mode, the first prompt module 720 may determine, based on the prompt mode, a prompt position, and a certain prompt interface range for presenting the recommended content based on a user terminal of the user terminal, and prompt the first user for the recommended content based on the prompt position and the prompt interface range. More details about determining the prompt position, the prompt interface range, and prompting the first user may be found in FIG. 4, FIG. 5, and FIG. 6, and related descriptions thereof, which will not be repeated herein.

In the technical solution disclosed in the embodiments of the present disclosure, based on the one or more user characteristics, the one or more environmental characteristics, the one or more first presentation characteristics, etc., it is possible to comprehensively judge the user's intention from a plurality of aspects, thereby determining the corresponding prompt mode, which not only can take users with different intentions into account at the same time, and provide users with the greatest convenience without disturbing users, but also take use needs of a user at different times and in different environments into account, so as to provide users with a good and convenient interactive experience.

It should be noted that the description of the characteristics is taken in a manner that is easy to read in the present disclosure. In practical applications, characteristics may be processed in various ways, including but not limited to keying, bucketing, classification, statistics, value change, combination, embedding, or the like. Original data may also be processed through a rule algorithm or a model to form new characteristics, which will not be limited in the present disclosure.

Figure 3:
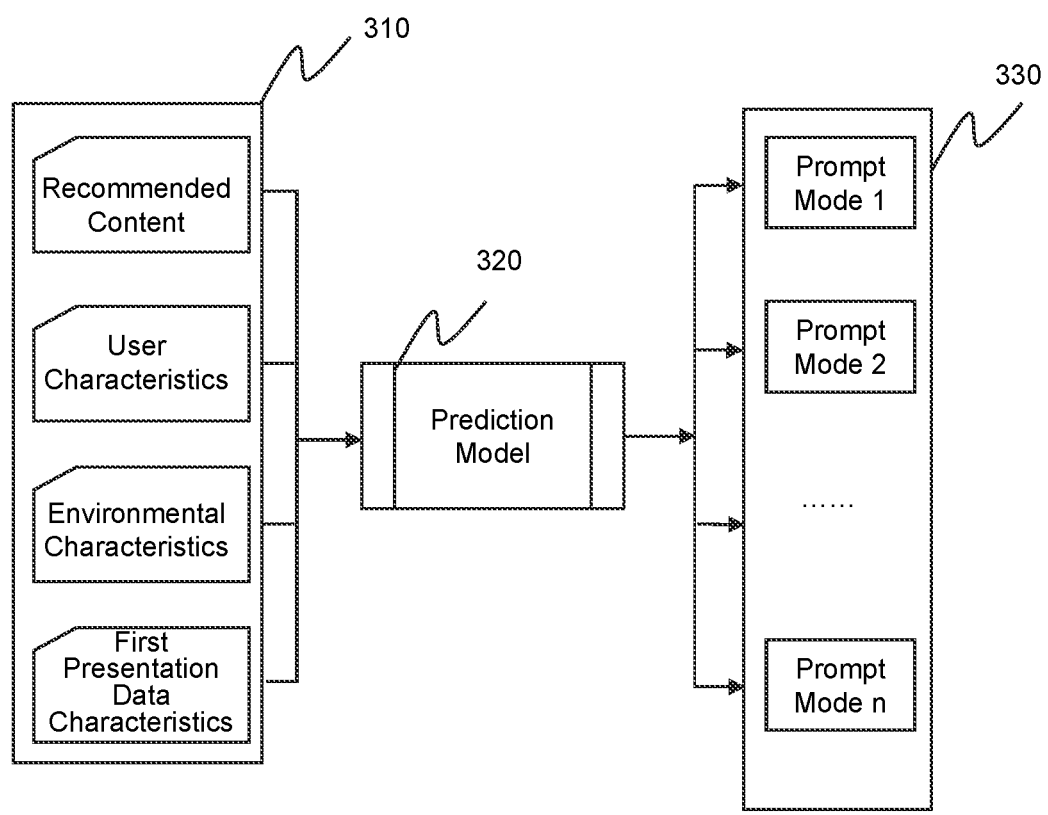
FIG. 3 is a schematic diagram illustrating an exemplary process for determining a prompt mode through a prediction model according to some embodiments of the present disclosure.

FIG. 3 is a schematic diagram illustrating an exemplary process for determining a prompt mode through a prediction model according to some embodiments of the present disclosure.

In some embodiments, the first determination module 710 may determine the prompt mode using a trained prediction model. As mentioned above, the prediction model for determining the prompt mode may be simply referred to as the first prediction model. The first prediction model may determine an appropriate prompt mode according to the input characteristic data. Specifically, the first prediction model may determine the prompt mode according to the recommended content associated with the first user, the one or more user characteristics associated with the first user, the one or more environmental characteristics of the user terminal associated with the first user, the one or more first presentation data characteristics associated with the user terminal, or any combination thereof that is input into the first prediction model. For example, the input of the first prediction model may be the one or more user characteristics, or may be the one or more user characteristics and the one or more environmental characteristics.

As shown in FIG. 3, an input 310 of the first prediction model 320 may include but is not limited to the recommended content associated with the first user, the one or more user characteristics associated with the first user, the one or more environmental characteristics of a user terminal associated with the first user, and the one or more first presentation data characteristics associated with the user terminal. For example, the input 310 may further include other characteristics (such as whether a power source is plugged in, whether a headset is plugged in), etc. An output 330 may be a prompt mode for displaying the recommendation content to the first user. More descriptions about the recommended content, the prompt mode, etc., may be found in the related descriptions of FIG. 2, which will not be repeated herein.

In some embodiments, the output of the first prediction model may be one or more prompt modes. For example, the output prompt mode may be a single type of prompt mode, such as a system prompt mode of the user terminal, or the like. As another example, the output prompt mode may be a plurality of types of prompt modes, such as a system prompt mode of the user terminal, a plurality of user interface prompt modes, a vibration prompt mode of the user terminal, etc. When a plurality of prompt modes are output, it means that the plurality of prompt modes may be used to prompt the first user at the same time. It may be understood that the above example is merely by way of example, and types of prompt modes output by the first prediction model will not be limited in the present disclosure.

In some embodiments, an output value of the first prediction model may be a probability of each prompt mode. For example, the output of the first prediction model may be a vector, and each element value of the vector may respectively represent a possibility of belonging to a certain prompt mode. According to the possibility that the input characteristics correspond to each prompt mode, the corresponding prompt mode may be further determined.

In some embodiments, the first prediction model may process the characteristic data using a common characteristic engineering manner to determine the prompt mode. For example, the characteristic engineering manner may include data conversion, characteristic selection, characteristic extraction, timestamp processing, or the like.

In some embodiments, the first prediction model may be a machine learning model. The prediction model may include a neural network model, a logistic regression model, a decision tree model, a random forest model, a gradient boosting tree model, a support vector machine, a Native Bayes model, etc. Preferably, the prediction model may be a neural network model.

It can be seen in the present disclosure that many characteristics may reflect the status of the first user and possible requirements for prompt modes to a certain extent. But in many cases, some characteristics may not have effective values that can produce effects, and in many cases, the available characteristic values may not be enough to determine the prompt mode alone or through simple rules. Therefore, the prompt mode may be determined based on a large number of extensive characteristics using the first prediction model, which may break the conventional limitations of initiating interaction with the user based on the rules. Limited by the complexity, the rule-based manner may only be based on comparatively few characteristics and limited by artificial rules, it may be difficult to get close to the actual diversified user preferences based on the limitations of the specified rules. Predicting based on machine learning technology may be based on more and richer characteristics, and the training data may be annotated based on the prompt mode popular with the user, which may make the predicted prompt mode have higher accuracy, and easier to get close to the actual diversified user preferences, thereby making the recommended behavior more acceptable to users, and making a range of target audience of the recommended behavior wider.

In some embodiments, the first prediction model may be obtained by performing a training operation based on a plurality of sets of training data with identifiers. Specifically, the plurality of sets of training data with identifiers may be input into the first preliminary prediction model, and the parameters of the first prediction model may be updated by training.

In some embodiments, a set of training data may include characteristic data related to second users, such as one or more recommended content, one or more user characteristics, one or more environmental characteristics, one or more first presentation data characteristics, or any combination thereof.

In some embodiments, the first determination module 710 may also obtain training data and identifiers based on operation feedback of the second users in response to the prompt mode corresponding to the second users, so as to further train the first prediction model. The operation feedback may refer to the user's interactive feedback on the recommended content displayed in the interactive interface. The interactive feedback may be a clicking, a sliding, a closing, an ignoring, etc. given by the user after the user terminal (e.g., the user terminal 130) displays the recommended content in an interactive interface to the user in an active prompt mode. The operation feedback may include positive feedback and negative feedback. For example, clicking and sliding may be positive feedback, and closing and ignoring may be negative feedback.

In some embodiments, the identifier may indicate that the user's operation feedback of the prompt mode is positive feedback or negative feedback. For example, the positive feedback may be identified as 1, and the negative feedback may be identified as 0. In some embodiments, the sample identifier may be a prompt mode determined based on operation feedback. In some embodiments, the sample identifier may also include a category identifier of the recommended content, for example, if the recommended content is text news, the corresponding sample identifier may be "text" and "a system prompt mode of a user terminal". If the recommended content is a news report with a chart attached, the corresponding sample identifier may be "chart" and "a user interface prompt mode".

In some embodiments, the identifier of the training data may be obtained by manual marking or other manners, which will not be limited in the embodiment.

In some embodiments, a training operation may be performed by a common manner based on the training sample. For example, a training operation may be performed based on gradient descent.

In some embodiments, the training operation may end when the trained first prediction model satisfies a preset condition. The preset condition may be that a loss function may converge, a value of the loss function may be less than a preset threshold, etc.

FIG. 4 is a schematic diagram illustrating an exemplary process for prompting a user based on a user interface prompt mode according to some embodiments of the present disclosure.

In 402, a prompt position and a prompt interface range for presenting the recommended content based on a user interface of the user terminal may be determined according to the user interface prompt mode. Specifically, operation 402 may be performed by a first prompt module 720.

The user interface may refer to a screen interface used by the user terminal to display content.

In some embodiments, the prompt position may be a location of the recommended content in the user interface when the recommended content is displayed to the first user. For example, positions such as top, bottom, left, right, top left, top right, bottom left, bottom right, a center of the user interface, or the like.

In some embodiments, the prompt position may include a coexisting position associated with the user interface or a suspension position associated with the user interface. The coexisting position may refer to a position in the same interface where the display information in the user interface exists. For example, the coexisting position may be located above, below, or to a side of the displayed information in the user interface, or may be a position where the displayed information surrounds the prompt content. The suspension position may refer to a suspension orientation of a suspension block/a suspension window in the current user interface. For example, suspending in the center, top, bottom, etc. of the user interface.

The prompt interface range may be a size range of the user interface that needs to be occupied when the recommended content is displayed to the first user. The prompt interface range may be a range of a fixed size, for example, a range of 100 pixels*100 pixels. The prompt interface range may also be a range of a certain proportion of the current user interface, for example, 10%, 20%, and 50% of the current user interface.

In some embodiments, the first prompt module 720 may obtain device parameters of the user terminal (e.g., the user terminal 130), and determine the size of the current interface from the device parameters. The user interface size may refer to a size of a display screen of the user terminal. For example, 5 inches, 12 inches, 24 inches, 27 inches, etc. The first prompt module 720 may determine, based on the size of the user interface, the prompt position and prompt interface range based on the user interface.

In some embodiments, a determination rule may be preset for the prompt position and the prompt interface range. When the user interface size is small, for example, less than 10 inches, in order to avoid occupying too much user interface, and to be able to clearly prompt, the prompt interface range may be selected from the user interface according to a percentage. Since the user interface is small, the user's sight may focus on the entire user interface, so the position of the prompt content may be any position of the user interface. For example, if the user interface size is 5 inches, then the position of the prompt may be determined from the user interface as the top, middle, bottom, etc., of the user interface, and the interface range may be 5%, 10%, 50%, etc., of the current user interface size. When the user interface is large, for example, larger than 10 inches, the user's sight may focus on the middle of the user interface, then the middle portion of the user interface may be determined as the prompt position, and a range of a preset fixed size may be selected as the interface range based on the size of the user interface, for example, if the user interface size is 24 inches, the interface range may be a range of 500*300 pixels. If the user interface size is 16 inches, the interface range may be a range of 300*180 pixels. If the interface size is 12 inches, the interface range may be a range of 100*100 pixels, etc.

In 404, the first user may be prompted for the recommended content with an icon prompt, a flashing prompt, a scrolling prompt, an auxiliary interface prompt, or any combination thereof based on the prompt position and the prompt interface range. Specifically, operation 404 may be performed by the first prompt module 720.

In some embodiments, the user interface prompt mode may include an icon prompt, a flashing prompt, a scrolling prompt, an auxiliary interface prompt.

The icon prompt may be to display a preset icon in the current user interface, for example, a triangle, a quadrangular, a round frame, a round frame with a number, etc.

The flashing prompt may dynamically display a preset message icon in the current user interface. A flashing manner may include constant light, breathing light, flow, gradual change, pulse, or the like. A flashing color may include single color (such as black, white, red, yellow, blue) or multiple colors (such as a color obtained by the superposition of red, green, and blue).

Figure 5:
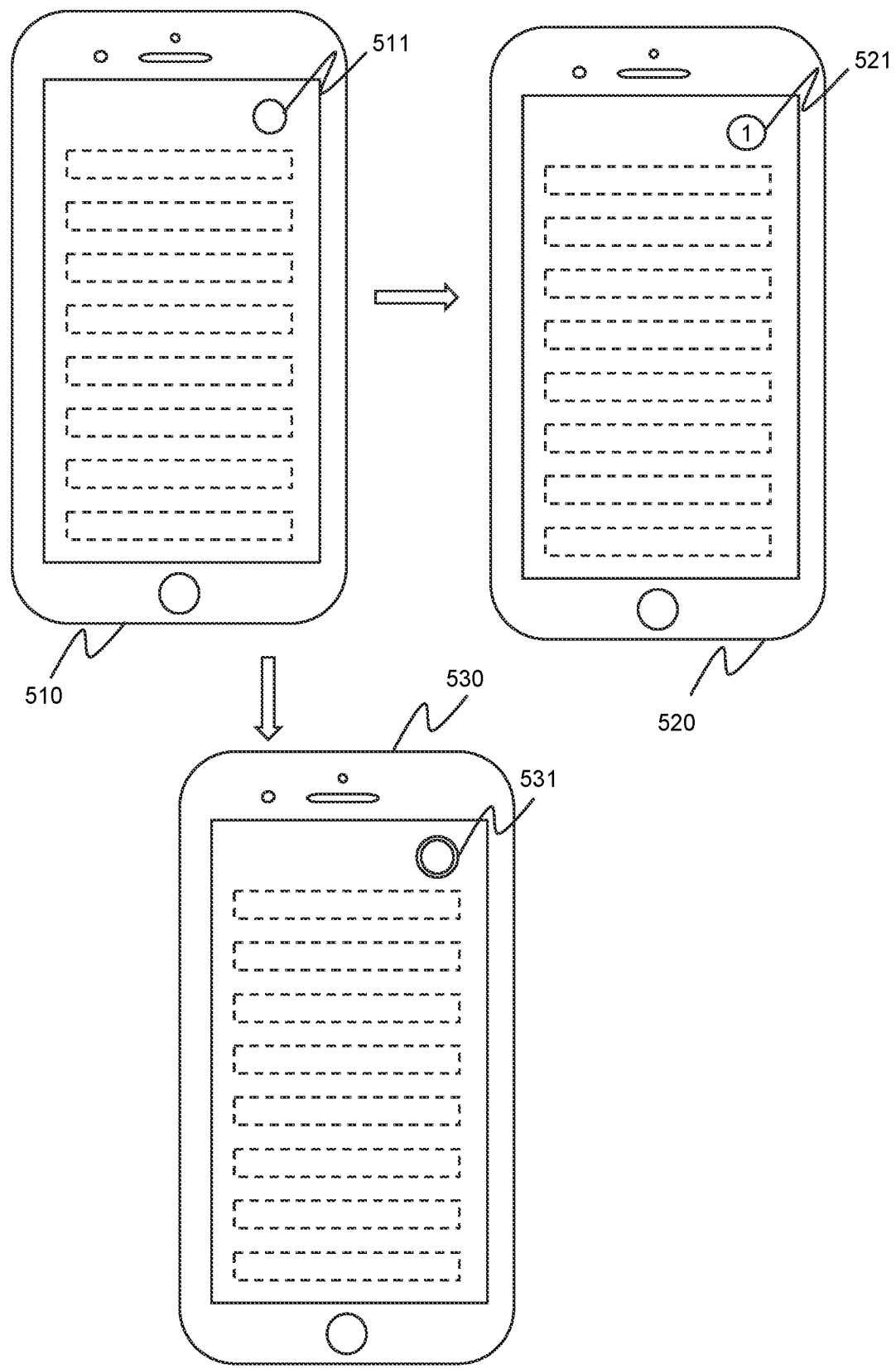
FIG. 5 is a schematic diagram illustrating an exemplary icon prompt and an exemplary flashing prompt according to some embodiments of the present disclosure.

FIG. 5 is a schematic diagram illustrating an exemplary icon prompt and an exemplary flashing prompt according to some embodiments of the present disclosure. Interface 510 exemplarily shows a user interface before the prompt. Interfaces 520 and 530 are exemplary schematic diagrams of icon prompt and flashing prompt, respectively. In 520, the icon 521 exemplarily shows another icon obtained after the icon 511 is changed, and it can be seen that the icon 521 may be obtained by adding a number 1 in the middle of the icon 511. The number in the icon may indicate a count of message(s) to be prompted, for example, the number 1 may mean that there is one message prompt, and the number 2 may mean that there are two message prompts. In 530, the icon 531 exemplarily shows the dynamic change of the icon 511. For example, the icon 511 is changed from a black and white static icon to a colorful and dynamic icon. When the icon 511 changes, it may mean that a new message arrives. The user may view detailed recommended content by clicking the changed icon (e.g., the icon 521, the icon 531) to go to another interface or a message pop-up window.

The scrolling prompt may refer to a scrolling display of text and/or one or more charts in a prompt box or at a certain position. A scrolling manner may include scrolling from left to right, scrolling from right to left, scrolling from top to bottom, scrolling from bottom to top, or the like.

Figure 6A:
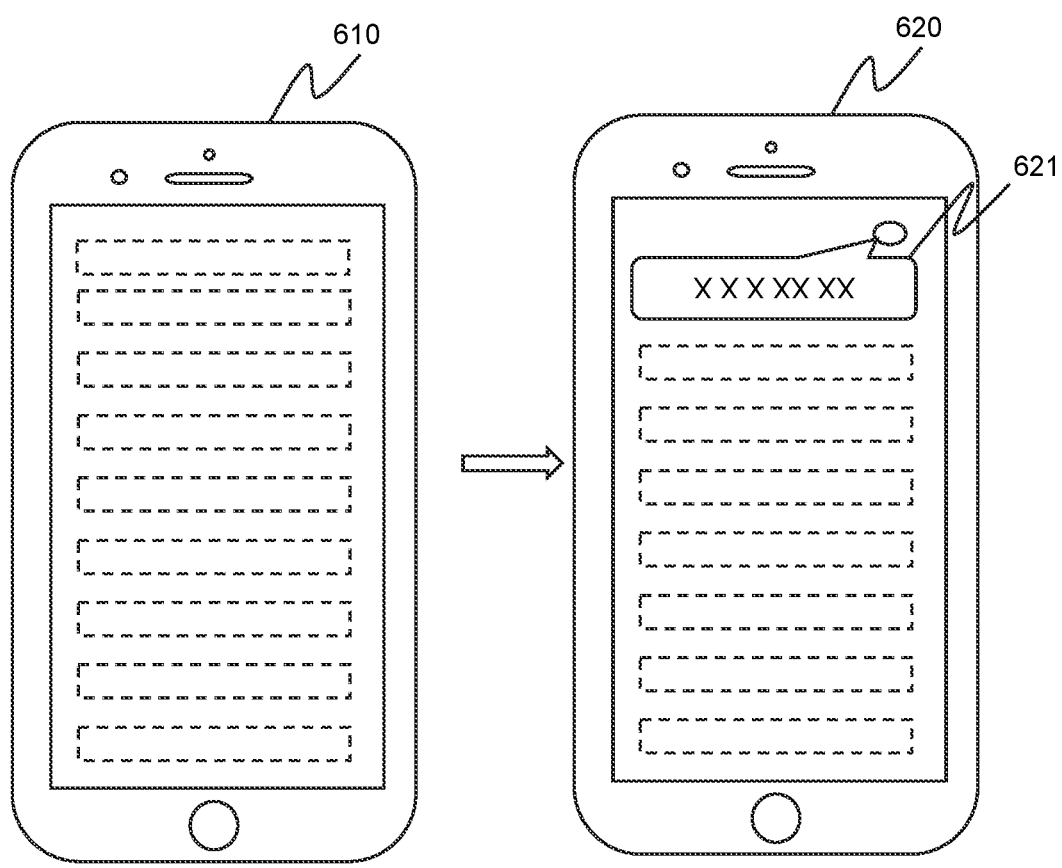
FIG. 6A is a schematic diagram illustrating an exemplary scrolling prompt according to some embodiments of the present disclosure.

FIG. 6A is a schematic diagram illustrating an exemplary scrolling prompt according to some embodiments of the present disclosure. Interface 610 exemplarily shows the user interface before prompting. Interface 620 is a user interface when the scrolling prompt is performed. Box 621 is a scrolling prompt box. The recommended content may be displayed in a scrolling form in the scrolling prompt box. In some embodiments, a position of the scrolling prompt box may be a coexisting position or a suspension position. For example, the display content in the current user interface may be moved down, and a vacant position may be used to place the scrolling prompt box. At this time, the scrolling prompt box and the current display content may coexist in the same interface. As another example, the scrolling prompt box may be a suspension prompt box, and the scrolling prompt box may be suspended above the display content in current user interface. The scrolling prompt may be preferentially selected in the coexisting position, thereby avoiding occlusion of the content in the current user interface, reducing interference to the user's browsing, and attracting the user's eyeballs in a scrolling manner to display the user the recommended content at the same time.

It is understood that the first user can view more detailed recommended content by clicking the scrolling prompt box or the pop-up interface/window.

The auxiliary interface prompt may include a pop-up window prompt and an interactive auxiliary interface prompt.

The pop-up window prompt may refer to a short-term pop-up of another interface or window in the current user interface, and the recommended content may be displayed to the user in the pop-up interface or window. The user may close the pop-up window by clicking the close button on the pop-up window, or click the pop-up window to adjust to another interface to view more detailed recommended content. The user may also wait for a period of time for the pop-up window to automatically disappear, for example, the pop-up window may automatically disappear from the current user interface after 3 seconds.

The interactive auxiliary interface may refer to an interactive interface or window displayed in the current user interface suspended in the current user interface. Interaction may refer to that the user can operate the auxiliary window to change the state or displayed content of the auxiliary window. The operation may include clicking, sliding, zooming in, zooming out, switching, closing, etc. The first prompt module 720 may correspondingly change the state and/or the displayed content of the interactive auxiliary interface according to the user's operation.

Figure 6B:
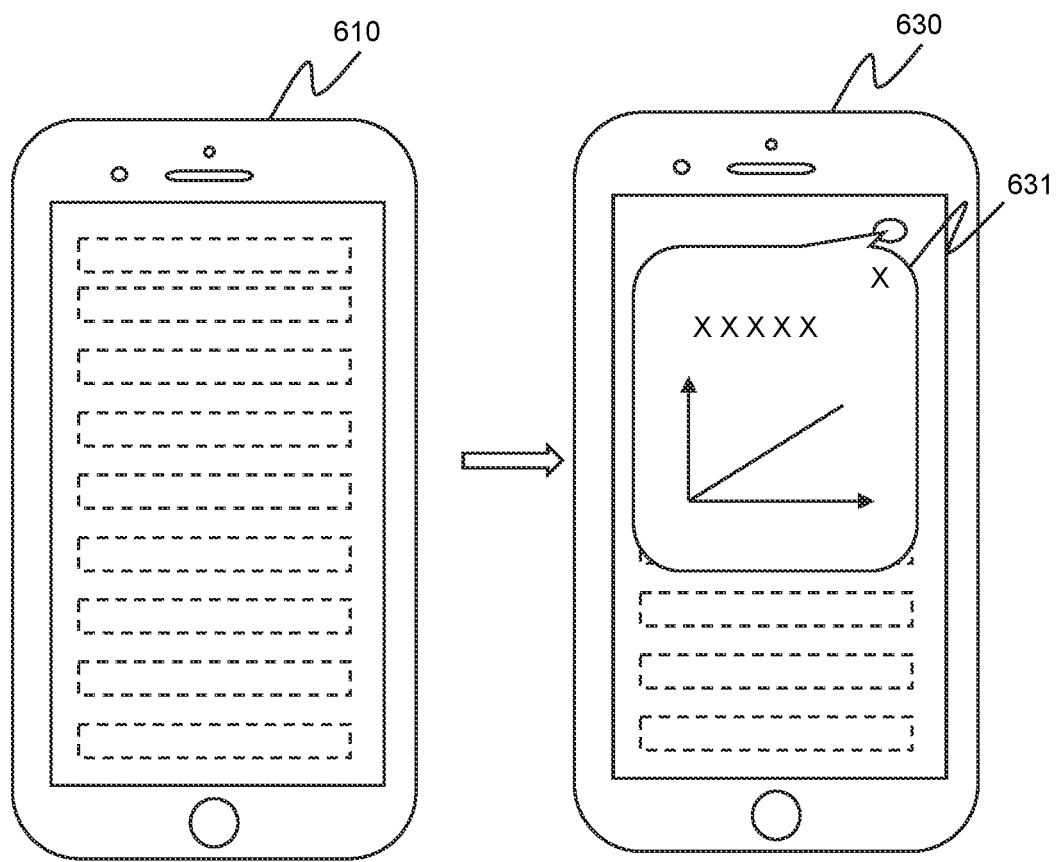
FIG. 6B is a schematic diagram illustrating an exemplary auxiliary interface prompt according to some embodiments of the present disclosure.

FIG. 6B is a schematic diagram illustrating an exemplary auxiliary interface prompt according to some embodiments of the present disclosure. As mentioned above, 610 is the user interface before prompting. Interface 630 is the user interface after prompting. In some embodiments, 631 may represent a pop-up interface or a pop-up window in a pop-up window prompt. In some embodiments, 631 may represent an auxiliary window in an interactive auxiliary interface prompt. As shown in 631, both the interface in the pop-up window prompt and the interactive auxiliary interface may display charts to quickly show users richer content. In the interactive auxiliary interface, a user may view more detailed content in the interactive auxiliary interface by clicking on a title, such as "XXXXX" in 631, and may browse charts by clicking, zooming in or zooming out a coordinate chart, or switch to a next chart by sliding the coordinate chart. In this way, the user may switch the recommended content in the interactive auxiliary window. While more detailed recommended content is browsed, the waiting time for window switching may be reduced, and the user experience may be further improved.

In some embodiments, the first prompt module 720 may set the confidence level for a plurality of different prompt positions and prompt interface ranges, and determine, based on the confidence level, to select the icon prompt, the flashing prompt, the scrolling prompt, the auxiliary interface prompt, the auxiliary interface prompt, or any combination thereof for prompting. For example, a mode with the highest confidence level or the mode with the confidence level greater than a preset threshold may be selected for prompting.

The setting manner of the confidence level may be the same as the setting manner in operation 202 of the present disclosure. More details may be found in the related descriptions of operation 202 of the present disclosure, which will not be repeated herein.

It should be noted that only the above example is merely by way of example, and is not intended to limit the prompt position and the prompt interface range. For example, it may be possible to prompt based on the prompt position and the prompt interface range in the form of banners, bubbles, toasts, etc.

Figure 7:
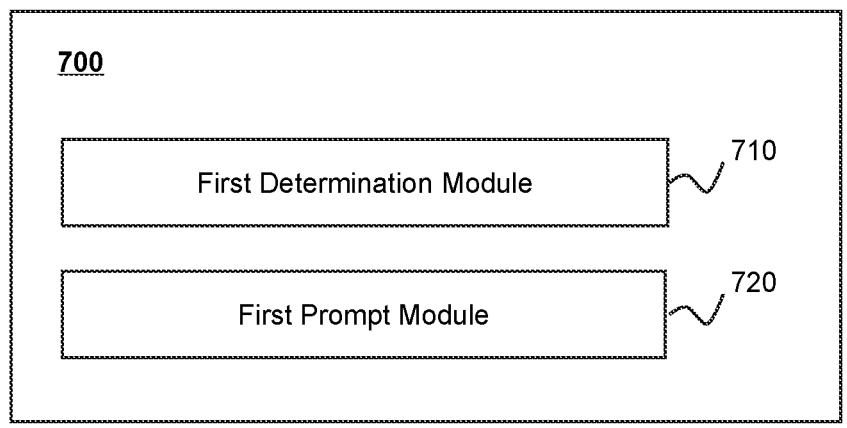
FIG. 7 is a schematic diagram illustrating an exemplary system for displaying an interactive interface of a recommended behavior according to some embodiments of the present disclosure.

FIG. 7 is a schematic diagram illustrating an exemplary system for displaying an interactive interface of a recommended behavior according to some embodiments of the present disclosure. As shown in FIG. 7, the system may include a first determination module 710 and a first prompt module 720.

The first determination module 710 may be configured to determine a prompt mode according to recommended content associated with a first user, one or more user characteristics associated with the first user, one or more environmental characteristics of a user terminal associated with the first user, one or more first presentation data characteristics associated with the user terminal, or any combination thereof.

In some embodiments, the prompt mode may include a plurality of system prompt modes of the user terminal, a plurality of user interface prompt modes of the user terminal, a vibration prompt mode of the user terminal, a voice prompt mode of the user terminal, or any combination thereof.

The first determination module 710 may be further configured to determine the prompt mode through a prediction model according to the recommended content associated with a first user, the one or more user characteristics associated with the first user, the one or more environmental characteristics of a user terminal associated with the first user, the one or more first presentation data characteristics associated with the user terminal, or any combination thereof. The prediction model may be a machine learning model. In some embodiments, the prediction model may be obtained by performing a training operation based on training data. The training data may be annotated based on operation feedback of a plurality of second users in response to prompt modes corresponding to the plurality of second users.

In some embodiments, the first determination module 710 may be further configured to determine the recommended content based on the one or more user characteristics and the one or more environmental characteristic.

In some embodiments, the one or more environment characteristics may include information of the user terminal at least one of: time information, one or more motion characteristics, one or more sound characteristics, one or more position characteristics, one or more functional use characteristics, one or more network characteristics, or one or more terminal status characteristics.

The first prompt module 720 may be configured to prompt the first user for the recommended content based on the prompt mode.

In some embodiments, the first prompt module 720 may be further configured to determine, based on the user interface prompt mode, a prompt position and a prompt interface range for presenting the recommended content based on a user interface of the user terminal, the prompt position including a coexisting position associated with the user interface or a suspension position associated with the user interface; and prompt the first user for the recommended content with at least one of an icon prompt, a flashing prompt, a scrolling prompt, or an auxiliary interface prompt based on the prompt position and the prompt interface range, the auxiliary interface prompt including text and/or one or more charts.

The specific description of the various modules of the system for displaying an interactive interface of a recommended behavior may be referred to the descriptions of the method for displaying an interactive interface of a recommended behavior in the present disclosure, for example, the related descriptions in FIG. 2-FIG. 6.

Figure 8:
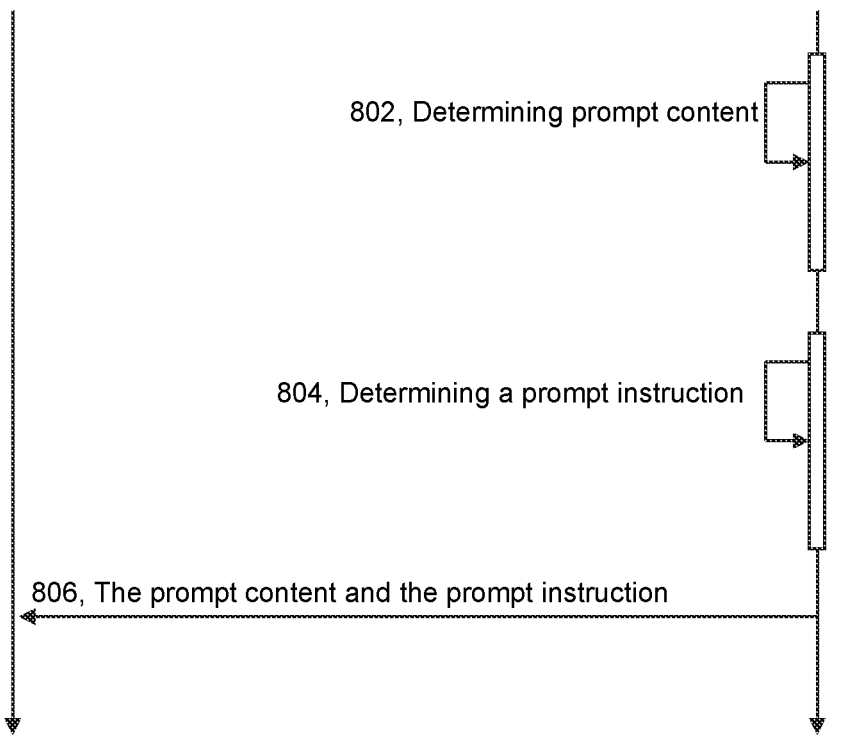
FIG. 8 is a schematic diagram illustrating another exemplary process for displaying an interactive interface of a recommended behavior according to some embodiments of the present disclosure.

FIG. 8 is a schematic diagram illustrating another exemplary process for displaying an interactive interface of a recommended behavior according to some embodiments of the present disclosure. As shown in FIG. 8, the process may include the following operations.

In 802, prompt content may be determined according to recommended content associated with a user. Specifically, the operation 802 may be performed by a second determination module 910.

The recommended content may be content predicted by a system that the user is interested in. More descriptions about the recommended content may be found in FIG. 2 and relevant descriptions thereof.

The prompt content may refer to displayed content when the user is prompted. The prompt content may be content related to the recommended content, for example, the prompt content may be a title, a catalog, an icon, an abstract, a summary, etc. of the recommended content. As another example, the prompt content may be a keyword associated with the recommended content.

The prompt content may be obtained by directly extracting the text content from the recommended content, or may be obtained by processing the text content of the recommended content through a natural language processing algorithm or a natural language processing model. The prompt content may also be determined by other common manners, which will not be limited in the embodiment.

In 804, a prompt instruction may be determined according to the recommended content, one or more user characteristics associated with the user, one or more second presentation data characteristics of a user terminal associated with the user, or any combination thereof. Specifically, operation 804 may be performed by a third determination module 920.

The second presentation data characteristics may refer to information displayed on a user terminal from a server. It may also be understood that the second presentation data characteristics are generated on the server, sent to the user terminal (such as the user terminal 130), and displayed on the user terminal. For example, the second presentation data may be a piece of news, a picture, a webpage, etc. that is sent by the server to the user terminal.

The prompt instruction may be a symbol or a tag indicating the user terminal to perform a prompt operation. For example, the prompt instruction may be "F1," "F2," "S1," "S2," "Instruction 1," "Instruction 2," or the like. The prompt instruction may be associated with the prompt mode. A prompt instruction may correspond to a prompt mode, or a prompt instruction may also correspond to a plurality of prompt modes. For example, the prompt instruction "S1" may correspond to the prompt mode 1. The prompt instruction "F1" may correspond to the prompt mode 1 and the prompt mode 2. The prompt instruction "F2" may correspond to the prompt mode 3 and the prompt mode 4, or the like.

In some embodiments, the third determination module 920 may determine one or more prompt modes on the server according to the recommended content, the one or more user characteristics associated with the user, the one or more second presentation data characteristics of a user terminal associated with the user, or any combination, and determine the prompt instruction according to the determined prompt mode.

In some embodiments, the third determination module 920 may determine the prompt mode in a manner such as a rule matching, a model prediction, or the like. The manner for determining the prompt mode may be similar to the manner for determining the prompt mode described in operation 204 in the present disclosure, and more details may be found in related descriptions of operation 240. It should be noted that the difference between the two manners is that the characteristic data in operation 204 includes the one or more environmental characteristics and the one or more first presentation data, and the one or more first presentation data characteristics is different from the second presentation data in the characteristic data in the embodiment. Specifically, the first presentation data may include data derived from the server and/or data from the user terminal, and the second presentation data is data derived from the server itself. Further, the third determining module 920 may match the prompt mode with the prompt instruction to determine the prompt instruction.

In some embodiments, the prompt instruction may also be determined by a third prediction model. For example, after the characteristic data is input to the third prediction model, the third prediction model may directly output corresponding prompt instructions through predicting.

In some embodiments, when determining the prompt instruction, the server may also obtain one or more environmental characteristics and/or one or more third presentation data characteristics from the user terminal, so that the third determination module 920 may be more accurate to determine the prompt instruction according to more characteristic data.

The one or more environmental characteristics may refer to various types of information associated with the current environment of the user terminal and/or associated with the user terminal. More descriptions of the one or more environmental characteristics may be found in the related descriptions of FIG. 2 and FIG. 3.

The one or more third presentation data characteristics may refer to information obtained and displayed by the user terminal from other data sources. Other data sources may refer to other devices other than the server, such as other servers, other user terminals, the user terminal itself, etc. For example, the one or more third presentation data characteristics may be text input, a photograph taken through the user terminal, or the like. As another example, the one or more third presentation data characteristics may be a document, a photograph, etc. that sent to the user terminal by other user terminals via Bluetooth. As yet another example, the one or more third presentation data characteristics may be content of an application running on the user terminal supported by other servers.

In some embodiments, the one or more environmental characteristics and/or the one or more third presentation data characteristics may be obtained by extracting from the user terminal or pushing by the user terminal, or obtained by other manners.

In some embodiments, the third determination module 920 may determine the prompt instruction according to the one or more environmental characteristics, the recommended content, the one or more user characteristics, the one or more second presentation data characteristics, the one or more third presentation data characteristics, or any combination thereof. The determination manner of the prompt mode and the prompt instruction may be identical or similar to the determination method described above in the present disclosure. For example, the third determination module 920 may determine the prompt mode according to the above characteristic data, and then determine the prompt instruction according to the prompt mode. Specific details may be found in the relevant description, which will not be repeated herein.

In 806, the prompt content and the prompt instruction may be sent to the user terminal. Specifically, operation 806 may be performed by a sending module 930.

The prompt instruction may be configured to instruct the user terminal to execute a corresponding prompt mode. That is, the prompt instruction may be configured to instruct the user terminal to prompt the prompt content in a prompt mode corresponding to the prompt instruction. For example, if the prompt instruction is "voice prompt," the user terminal may broadcast the prompt content by voice. As another example, if the prompt instruction is "an auxiliary interface prompt," the user terminal may display the prompt content in a pop-up window interface or an interactive auxiliary interface to prompt the user.

In some embodiments, the sending module 930 on the server may send the prompt content and the prompt instruction to the user terminal by a common manner. For example, the prompt content and the prompt instruction may be sent via a network.

Figure 9:
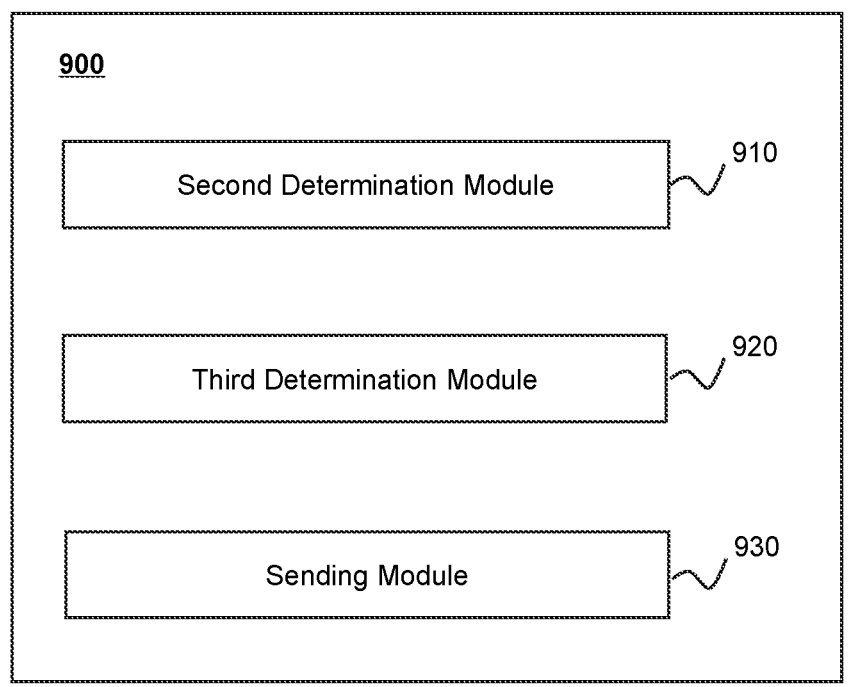
FIG. 9 is a schematic diagram illustrating another exemplary system for displaying an interactive interface of a recommended behavior according to some embodiments of the present disclosure.

FIG. 9 is a schematic diagram illustrating another exemplary system for displaying an interactive interface of a recommended behavior according to some embodiments of the present disclosure. As shown in FIG. 9, the system may include a second determination module 910, a third determination module 920, and a sending module 930.

The second determination module 910 may be configured to determine prompt content according to recommended content associated with a user.

In some embodiments, the second determination module 910 may extract at least a part of the content as the prompt content from the recommended content. The recommended content may refer to content predicted by the system that the user is interested in. The prompt content may refer to displayed content when the user is prompted.

The third determination module 920 may be configured to determine a prompt instruction according to the recommended content, one or more user characteristics associated with the user, one or more second presentation data characteristics of a user terminal associated with the user, or any combination thereof.

In some embodiments, the third determination module 920 may determine one or more prompt modes according to according to the recommended content, the one or more user characteristics associated with the user, the one or more second presentation data characteristics of a user terminal associated with the user, or any combination thereof, and determine the prompt instruction according to the determined prompt mode.

The transmission module 930 may be configured to send the prompt content and the prompt instruction to the user terminal. The prompt instruction may be configured to determine a prompt mode of the user terminal for the prompt content.

In some embodiments, the sending module 930 may send the prompt content and the prompt instruction to the user terminal over a network.

The specific descriptions of each module of the system for displaying an interactive interface of a recommended behavior may be found in the descriptions of the method for displaying an interactive interface of a recommended behavior in the present disclosure, for example, the related descriptions of FIG. 8.

Figure 10:
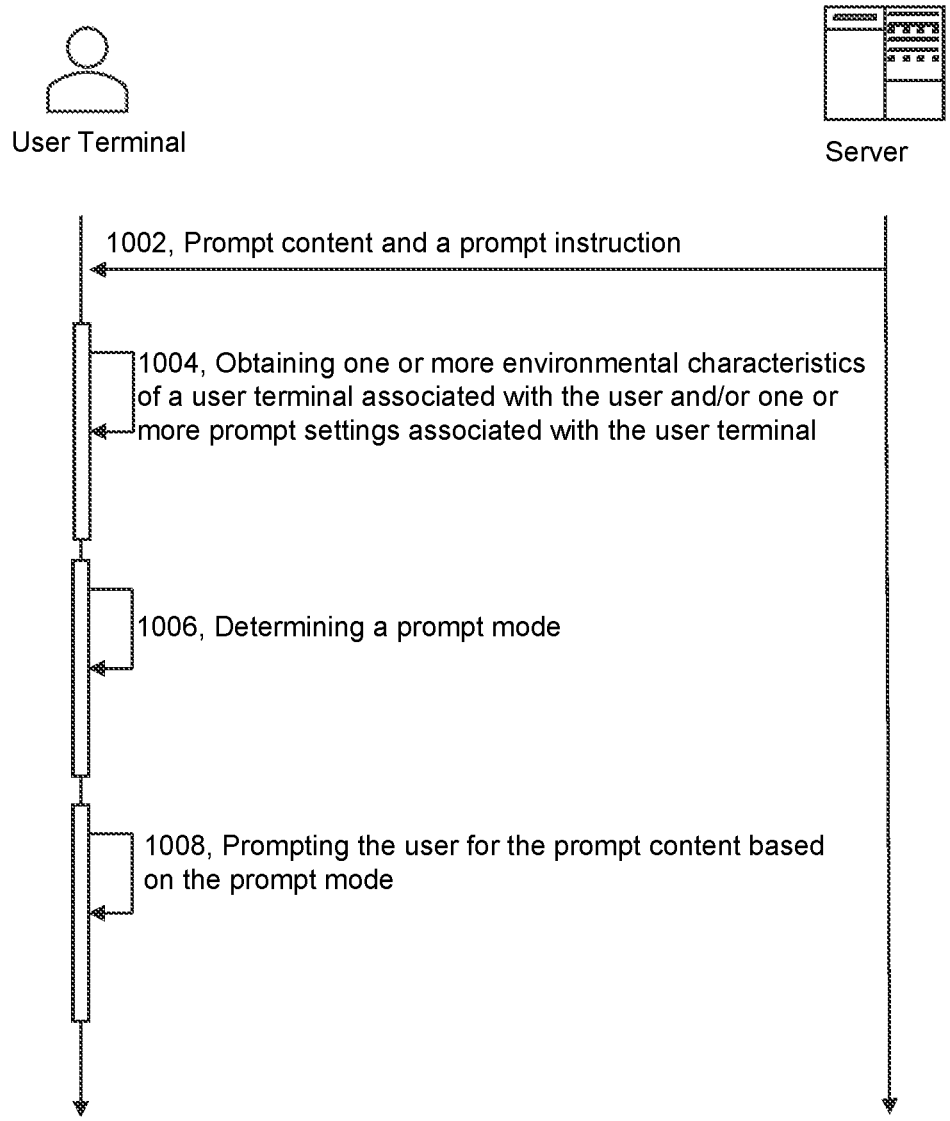
FIG. 10 is a schematic diagram illustrating yet another exemplary process for displaying an interactive interface of a recommended behavior according to some embodiments of the present disclosure.

FIG. 10 is a schematic diagram illustrating yet another exemplary method for displaying an interactive interface of a recommended behavior according to some embodiments of the present disclosure. As shown in FIG. 10, the method may include the following operations.

In 1002, prompt content associated with a user and a prompt instruction may be obtained from a server. Specifically, operation 1002 may be performed by a first obtaining module 1110.

The prompt content may refer to the displayed content when the user is prompted. The prompt instruction may be a symbol or a tag instructing the user terminal to execute a prompt operation. More descriptions and obtaining manners of the prompt content and the prompt instruction may be found in FIG. 8 and relevant descriptions thereof, which will not be repeated herein.

In some embodiments, operation 1002 may be performed by the user terminal (e.g., the user terminal 130) through the first obtaining module 1110. The first obtaining module 1110 may obtain the prompt content and the prompt instruction by sending a request to the server, or obtain the prompt content and the prompt instruction by sending, by the server, the prompt content and the prompt instruction to the user terminal, or obtain the prompt content and the prompt instruction by other means.

In 1004, one or more environmental characteristics of a user terminal associated with the user and/or one or more prompt settings associated with the user terminal may be obtained. Specifically, operation 1004 may be performed by a second obtaining module 1120.

The one or more environmental characteristics may refer to various types of information associated with the current environment of the user terminal and/or associated with the user terminal. More descriptions about the one or more environmental characteristics may be found in the relevant descriptions of operation 202, and which will not be repeated herein.

The prompt setting may refer to device parameters configured when the user terminal sets prompt, for example, vibration intensity, prompt volume, whether the auxiliary interface disappears automatically, automatic disappearance time of the auxiliary interface, etc.

In some embodiments, the prompt setting may be set by a user of the user terminal, or may be set by the manufacturer of the user terminal when delivered from a factory, or may be set in other ways.

In some embodiments, operation 1004 may be performed by the user terminal through the second obtaining module 1120. The second obtaining module 1120 may obtain the one or more environmental characteristics through a sensor of the user terminal. The second obtaining module 1120 may obtain the prompt setting from system parameters or stored data of the user terminal.

In 1006, a prompt mode may be determined for the prompt content according to the one or more environmental characteristics, the one or more prompt settings, the prompt instruction, or any combination. Specifically, operation 1006 may be performed by a fourth determination module 1130.

The prompt mode may include different system prompt modes of the user terminal, different user interface prompt modes of the user terminal, a vibration prompt mode of the user terminal, a voice prompt mode of the user terminal, or any combination thereof. More details about the prompt mode may be found in operation 204 and relevant descriptions thereof, which will not be repeated herein.

In some embodiments, the fourth determining module 1130 may determine the prompt mode for the prompt content separately according to the one or more environmental characteristics, the one or more prompt settings, or the prompt instruction. For example, when the environment is noisy, a user interface prompt mode related to visual sense may be selected. The prompt mode corresponding to the prompt instruction may be directly determined as the prompt mode. In some embodiments, the fourth determination module 1130 may determine the corresponding prompt mode according to the one or more environmental characteristics, the one or more prompt settings, the prompt instruction, or any combination thereof. For example, if the prompt setting of the user terminal is set to be exempted from disturbing, and the prompt mode corresponding to the prompt instruction is a voice prompt mode, the fourth determination module may determine that the prompt mode is a user interface prompt mode or a vibration prompt mode without sound, or the like. In some embodiments, the prompt mode may also be determined in other ways, which is not limited in the present disclosure.

In some embodiments, the fourth determining module 1130 may determine the prompt mode through matching rules or using a fourth predictive model based on the one or more environmental characteristics, the one or more prompt settings, the prompt instruction, or any combination thereof. The manner is similar to the manner of determining the prompt mode through matching rules or using a first prediction model based on the recommended content, the one or more user characteristics, the one or more environmental characteristics, the one or more first presentation data characteristics, and the difference may lie in the difference in the use of characteristics. Specific details of the manner of determining the prompt mode through matching rules or using the fourth prediction model may be found in FIG. 2, FIG. 3 and relevant descriptions thereof, which will not be repeated herein.

In 1008, the user may be prompted for the prompt content based on the prompt mode. Specifically, operation 1008 may be performed by a second prompt module 1140.

In some embodiments, prompting the user may refer to reminding the user. More details about prompting the user by the prompt mode may be found in operation 204 and relevant descriptions thereof, which will not be repeated herein.

In some embodiments, the user terminal may display or present the prompt content to the user by the second prompt module 1140 according to the prompt mode to remind the user that there is a new message.

Figure 11:
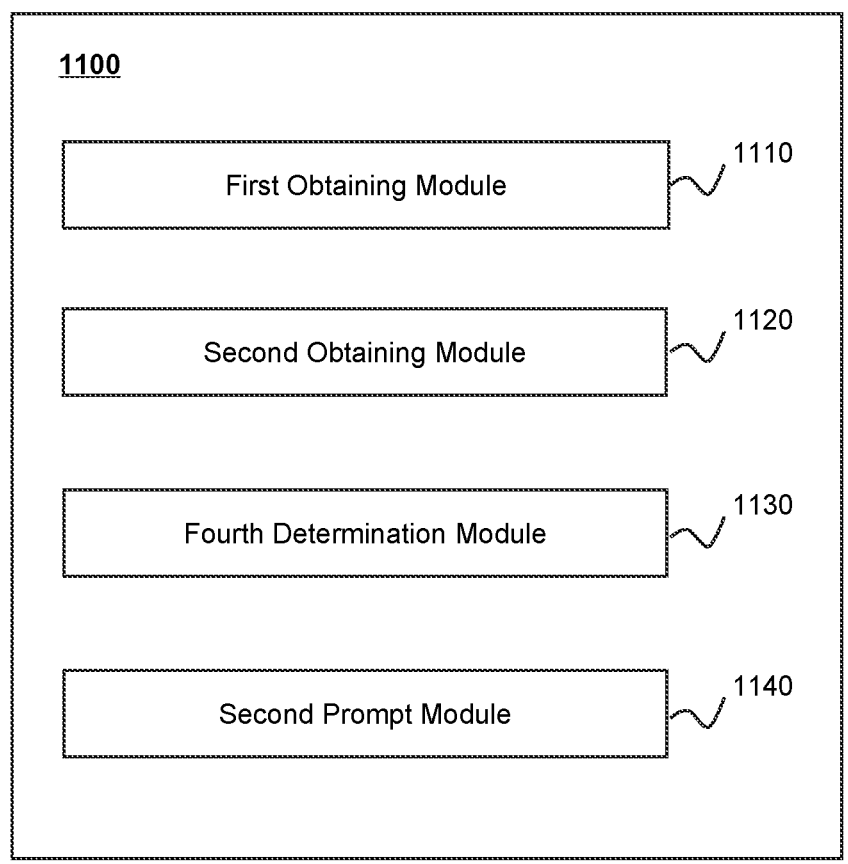
FIG. 11 is a schematic diagram illustrating yet another exemplary system for displaying an interactive interface of a recommended behavior according to some embodiments of the present disclosure.

FIG. 11 is a schematic diagram illustrating yet another exemplary system for displaying an interactive interface of a recommended behavior according to some embodiments of the present disclosure. As shown in FIG. 11, the system may include a first obtaining module 1110, a second obtaining module 1120, a fourth determination module 1130, and a second prompt module 1140.

The first obtaining module 1110 may be configured to obtain prompt content associated with a user and a prompt instruction from a server.

In some embodiments, the first obtaining module 1110 may obtain the prompt content and the prompt instruction from a server through the network.

The second obtaining module 1120 may be configured to obtain one or more environmental characteristics of a user terminal associated with the user and/or one or more prompt settings associated with the user terminal.

In some embodiments, the second obtaining module 1120 may obtain the one or more environmental characteristics through a sensor of the user terminal. The second obtaining module 1120 may obtain the one or more prompt settings from system parameters or stored data of the user terminal.

The fourth determination module 1130 may be configured to determine a prompt mode for the prompt content according to the one or more environmental characteristics, the one or more prompt settings, the prompt instructions, or any combination thereof.

In some embodiments, the prompt mode may include different system prompt modes of the user terminals, different user interface prompt modes of the user terminal, a vibration prompt mode of the user terminal, a voice prompt mode of the user terminal, or any combination thereof.

The second prompt module may be configured to prompt the user for the prompt content based on the prompt mode.

The specific descriptions of each module of the system for displaying an interactive interface of a recommended behavior may be found in the flowchart of the present disclosure, for example, the relevant descriptions of FIG. 11.

It should be understood that the systems and modules shown in FIG. 7, FIG. 9, and FIG. 11 may be implemented in various ways. For example, in some embodiments, the system and its modules thereof may be implemented by hardware, software, or a combination of software and hardware. The hardware may be implemented by a specific logic. The software may be stored in a storage and executed by an appropriate instruction execution system, such as a microprocessor or a dedicated design hardware. It will be understood by those skilled in the art that the above-mentioned methods and systems may be implemented using computer-executable instructions and/or embedded in control codes of a processor. For example, the control codes may be provided by a carrier medium, such as a disk, a CD or a DVD-ROM, a programmable storage such as a read-only memory (firmware), or a data carrier such as an optical carrier or an electronic signal carrier. The system and its modules thereof of the present disclosure may be implemented by a hardware circuit such as a super large-scale integrated circuits or a gate arrays, a semiconductor such as a logic chip, a transistor, etc., or a programmable hardware device such as a field programmable gate array, a programmable logic device, etc. The system and its modules thereof may be implemented by software that can be executed by various processors, or may be implemented by a combination (e.g., firmware) of the hardware circuit and the software.

It should be noted that the above description of the system for displaying an interactive interface of a recommended behavior and modules thereof is provided for convenience of illustration, and not intended to limit the present disclosure within the scope of the embodiments mentioned. It may be understood that for those skilled in the art, after understanding the principle of the system, various modules may be combined arbitrarily, or the subsystems may be connected to other modules without departing from the principle. For example, the first determination module 710 disclosed in FIG. 7 and the first prompt module 720 may be different modules in one system, or may be integrated as a module to implement the functions of the two modules mentioned above. As another example, the first determination module 710 and the first prompt module 720 in the system 700 for displaying an interactive interface of a recommended behavior may share a storage module, and each module may also have its own storage module. All such modifications are within the protection scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, all aspects of the present disclosure may be performed entirely by hardware, may be performed entirely by software (including firmware, resident software, microcode, etc.), or may be performed by a combination of hardware and software. The above hardware or software can be referred to as "data block," "module," "engine," "unit," "component" or "system." In addition, aspects of the present disclosure may appear as a computer product located in one or more computer-readable media, the product including computer-readable program code.

A computer storage medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer storage medium may be any computer readable medium that is not a computer readable storage medium and that may communicate, propagate, or transport a program for use by or in connection with an instruction execution system, apparatus, or device. Program code embodied on a computer storage medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment. Rather, claimed subject matter may lie in less than all characteristics of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. It should be noted that if the description, definition, and/or terms used in the appended application of the present disclosure is inconsistent or conflicting with the content described in the present disclosure, the use of the description, definition and/or terms of the present disclosure shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for displaying an interactive interface of a recommended behavior, comprising:
    one or more storage devices including a set of instructions; and
    one or more processors configured to communicate with the one or more storage devices, wherein when executing the set of instructions, the one or more processors are directed to cause the system to perform operations including:
        determining recommended content associated with a first user based on one or more user characteristics associated with the first user and one or more environmental characteristics of a user terminal associated with the first user, wherein the recommended content is content that the first user is interested in;
        determining a prompt mode of the recommended content through a prediction model by inputting first characteristic data, wherein the first characteristic data includes the recommended content associated with the first user, the one or more user characteristics associated with the first user, the one or more environmental characteristics of the user terminal associated with the first user, and one or more first presentation data characteristics associated with the user terminal, the prediction model being a machine learning model, the prompt mode including at least one of a plurality of system prompt modes of the user terminal, a plurality of user interface prompt modes of the user terminal, a vibration prompt mode of the user terminal, or a voice prompt mode of the user terminal; and
        prompting the first user for the recommended content based on the prompt mode.

2. The system of claim 1, wherein:
    the prediction model is obtained by performing a training operation based on training data, the training data being annotated based on operation feedback of a plurality of second users in response to prompt modes corresponding to the plurality of second users.

3. The system of claim 1, wherein prompting the first user for the recommended content based on the user interface prompt mode includes:
    determining, based on the user interface prompt mode, a prompt position and a prompt interface range for presenting the recommended content based on a user interface of the user terminal, the prompt position including a coexisting position associated with the user interface or a suspension position associated with the user interface; and
    prompting the first user for the recommended content with at least one of an icon prompt, a flashing prompt, a scrolling prompt, or an auxiliary interface prompt based on the prompt position and the prompt interface range, the auxiliary interface prompt including text and/or one or more charts.

4. The system of claim 1, wherein the one or more environmental characteristics include information of the user terminal including at least one of:
    time information, one or more motion characteristics, one or more sound characteristics, one or more position characteristics, one or more functional use characteristics, one or more network characteristics, or one or more terminal status characteristics.

5. The system of claim 1, wherein the one or more user characteristics include one or more identity characteristics of the first user and/or one or more historical operation characteristics of the first user.

6. A system for displaying an interactive interface of a recommended behavior, comprising:
    one or more storage devices including a set of instructions; and
    one or more processors configured to communicate with the one or more storage devices, wherein when executing the set of instructions, the one or more processors are directed to cause the system to perform operations including:
    determining recommended content associated with a user based on one or more user characteristics associated with the user, wherein the recommended content is content that the user is interested in;
    determining prompt content according to the recommended content associated with the user;
    determining a prompt instruction according to the recommended content associated with the user, the one or more user characteristics associated with the user, and one or more second presentation data characteristics of the user terminal associated with the user; and
    sending the prompt content and the prompt instruction to the user terminal, the prompt instruction being configured to determine a prompt mode of the user terminal through a prediction mode for the prompt content, the prediction model being a machine learning model.

7. The system of claim 6, wherein the one or more processors are directed to cause the system to perform the operations including:
    obtaining, from the user terminal, one or more environmental characteristics associated with the user terminal and/or one or more third presentation data characteristics associated with the user terminal; and
    determining the prompt instruction according to at least one of the one or more environmental characteristics, the recommended content, the one or more user characteristics, the one or more second presentation data characteristics, or the one or more third presentation data characteristics.

8. The system of claim 7, wherein the one or more environmental characteristics include information of the user terminal including at least one of:
    time information, one or more motion characteristics, one or more sound characteristics, one or more position characteristics, one or more functional use characteristics, one or more network characteristics, or one or more terminal status characteristics.

9. The system of claim 6, wherein the one or more user characteristics include one or more identity characteristics of the user and/or one or more historical operation characteristics of the user.

10. The system of claim 6, wherein determining the prompt instruction includes:
    determining the prompt instruction through a prediction model according to the recommended content, the one or more user characteristics, and the one or more second presentation data characteristics, the prediction model being a machine learning model.

11. The system of claim 6, wherein the prompt mode includes a system prompt mode of the user terminal, a user interface prompt mode of the user terminal, a vibration prompt mode of the user terminal, or a voice prompt mode of the user terminal.

12. The system of claim 6, wherein the prompt content refers to displayed content configured to prompt the user for the recommended content.

13. The system of claim 12, wherein the prompt content includes at least one of a title, a catalog, an icon, an abstract, a keyword, or a summary of the recommended content.

14. A system for displaying an interactive interface of a recommended behavior, comprising:
    one or more storage devices including a set of instructions; and
    one or more processors configured to communicate with the one or more storage devices, wherein when executing the set of instructions, the one or more processors are directed to cause the system to perform operations including:
        obtaining prompt content associated with a user and a prompt instruction from a server, wherein the prompt content refers to displayed content configured to prompt the user for a recommended content, the recommended content is determined based on one or more user characteristics associated with the user and one or more environmental characteristics, and the recommended content is content that the user is interested in;
        obtaining one or more environmental characteristics of a user terminal associated with the user and one or more prompt settings associated with the user terminal; determining a prompt mode through a prediction model for the prompt content by inputting second characteristic data, wherein the second characteristic data includes the one or more environmental characteristics, the one or more prompt settings, and the prompt instruction, the prediction model being a machine learning model, the prompt mode including different system prompt modes of the user terminal, different user interface prompt modes of the user terminal, a vibration prompt mode of the user terminal, or a voice prompt mode of the user terminal; and
        prompting the user for the prompt content based on the prompt mode.

15. The system of claim 14, wherein the one or more environmental characteristics include information of the user terminal including at least one of:
    time information, one or more motion characteristics, one or more sound characteristics, one or more position characteristics, one or more functional use characteristics, one or more network characteristics, or one or more terminal status characteristics.

16. The system of claim 14, wherein the prompt content includes at least one of a title, a catalog, an icon, an abstract, a keyword, or a summary of the recommended content.

17. The system of claim 3, wherein the prompting the first user for the recommended content with an icon prompt based on the prompt position and the prompt interface range includes:
    in response to receiving a new message, changing an icon in the user interface dynamically, wherein the change of the icon includes a color change of the icon and/or a value change in the icon; and
    in response to clicking the changed icon by the first user, redirecting the user interface from a current page to another page, or popping up a message window to display a detail of the recommended content.

18. The system of claim 1, further including:
    determining a confidence level of a recommendation service based on interactive feedback of the first user; and
    determining, based on the confidence level, a modal or a non-modal of the prompt mode, wherein the modal and the non-modal are divided based on a degree of interference to the first user.

* * * * *